(12) United States Patent
Takiguchi et al.

(10) Patent No.: US 10,908,773 B2
(45) Date of Patent: Feb. 2, 2021

(54) HOME SCREEN SETTINGS FOR INFORMATION PROCESSING DEVICE AND INFORMATION PROCESSING SYSTEM, AND RECORDING MEDIUM THEREFOR

(71) Applicant: NINTENDO CO., LTD., Kyoto (JP)

(72) Inventors: Takahiro Takiguchi, Kyoto (JP); Hiroyuki Kono, Kyoto (JP); Masayoshi Kobayashi, Kyoto (JP); Takashi Hosoi, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 1229 days.

(21) Appl. No.: 14/830,993

(22) Filed: Aug. 20, 2015

(65) Prior Publication Data

US 2016/0062628 A1 Mar. 3, 2016

(30) Foreign Application Priority Data

Aug. 26, 2014 (JP) ................................. 2014-171365

(51) Int. Cl.
*G06F 3/14* (2006.01)
*G06F 3/0482* (2013.01)
(Continued)

(52) U.S. Cl.
CPC ............. *G06F 3/0482* (2013.01); *G09G 5/00* (2013.01); *A63F 13/30* (2014.09); *A63F 13/40* (2014.09);
(Continued)

(58) Field of Classification Search
CPC ... G06F 3/0482; G06F 3/04842; G06F 3/0485
(Continued)

(56) References Cited

U.S. PATENT DOCUMENTS 6,252,594 B1 6/2001 Xia et al.
9,274,696 B1 3/2016 Mierau et al.
(Continued)

FOREIGN PATENT DOCUMENTS

EP 2 040 445 3/2009
JP H05-189190 7/1993
(Continued)

OTHER PUBLICATIONS

Non-Final Office Action dated Jul. 12, 2017 in U.S. Appl. No. 14/831,006.
(Continued)

*Primary Examiner* — Jennifer N To
*Assistant Examiner* — Amy P Hoang
(74) *Attorney, Agent, or Firm* — Nixon & Vanderhye, P.C.

(57) ABSTRACT

An example system includes: an information processing device including a display processing unit performing processing of displaying on a display unit a basic screen containing a selection image and a background image, the selection image being constructed from one or a plurality of images used for receiving selection operation, the background image serving as a background of the selection image; and a background image transmission device transmitting the background image of the basic screen. The display processing unit of the information processing device automatically receives the background image transmitted by the background image transmission device and displays the received background image in the background of the selection image.

14 Claims, 16 Drawing Sheets

(51) Int. Cl.
*G09G 5/00* (2006.01)
*G09G 5/36* (2006.01)
*A63F 13/40* (2014.01)
*A63F 13/30* (2014.01)

(52) U.S. Cl.
CPC .............. *G06F 3/14* (2013.01); *G09G 5/36* (2013.01); *G09G 2340/12* (2013.01); *G09G 2340/14* (2013.01); *G09G 2354/00* (2013.01)

(58) Field of Classification Search
USPC ....................................................... 715/778
See application file for complete search history.

(56) References Cited

U.S. PATENT DOCUMENTS

| | | |
|---|---|---|
| 2003/0070538 A1 | 4/2003 | Sugiyama et al. |
| 2005/0085272 A1 | 4/2005 | Anderson et al. |
| 2007/0032944 A1 | 2/2007 | Inagaki |
| 2007/0256074 A1 | 11/2007 | Jeong |
| 2008/0192714 A1 | 8/2008 | Kim et al. |
| 2008/0204266 A1 | 8/2008 | Malmberg et al. |
| 2009/0157847 A1 | 6/2009 | Shibata |
| 2009/0163182 A1* | 6/2009 | Gatti ................. H04M 1/72544 455/414.1 |
| 2010/0235768 A1 | 9/2010 | Agevik et al. |
| 2010/0302003 A1 | 12/2010 | Zellner |
| 2011/0126156 A1 | 5/2011 | Krishmaraj et al. |
| 2011/0138334 A1 | 6/2011 | Jung |
| 2011/0296324 A1 | 12/2011 | Goessens et al. |
| 2012/0023425 A1 | 1/2012 | Hackborn et al. |
| 2012/0254791 A1 | 10/2012 | Jackson et al. |
| 2012/0306632 A1 | 12/2012 | Fleizach et al. |
| 2012/0313946 A1 | 12/2012 | Nakamura et al. |
| 2012/0319938 A1 | 12/2012 | Gervais et al. |
| 2013/0082824 A1 | 4/2013 | Colley |
| 2013/0326409 A1 | 12/2013 | Nogami et al. |
| 2015/0029197 A1 | 1/2015 | Almosnino et al. |
| 2015/0234568 A1 | 8/2015 | Jackson et al. |
| 2016/0062628 A1 | 3/2016 | Takiguchi et al. |
| 2016/0062629 A1 | 3/2016 | Takiguchi et al. |

FOREIGN PATENT DOCUMENTS

| | | |
|---|---|---|
| JP | 2002-170030 | 6/2002 |
| JP | 2002-215074 | 7/2002 |
| JP | 2002-216065 | 8/2002 |
| JP | 2003-122358 | 4/2003 |
| JP | 2004-184161 | 7/2004 |
| JP | 2005-506613 | 3/2005 |
| JP | 2007-042029 | 2/2007 |
| JP | 2007-172044 | 7/2007 |
| JP | 2007-536769 | 12/2007 |
| JP | 2008-033956 | 2/2008 |
| JP | 2010-087629 | 4/2010 |
| JP | 2011-508571 | 3/2011 |
| JP | 2013-016082 | 1/2013 |
| JP | 2013-519953 | 5/2013 |
| JP | 2013-200898 | 10/2013 |
| JP | 2013-235394 | 11/2013 |
| JP | 2013-250895 | 12/2013 |
| JP | 2014-095981 | 5/2014 |
| WO | 2003/032289 | 4/2003 |
| WO | 2011/100623 | 8/2011 |
| WO | 2013/040048 | 3/2013 |

OTHER PUBLICATIONS

Non-Final Office Action dated Jul. 14, 2017 in U.S. Appl. No. 14/831,019.
Takiguchi et al., U.S. Appl. No. 14/831,006, filed Aug. 20, 2015.
Takiguchi et al., U.S. Appl. No. 14/831,019, filed Aug. 20, 2015.
Final Office Action dated Jan. 19, 2018 in U.S. Appl. No. 14/831,006.
Final Office Action dated Jan. 23, 2018 in U.S. Appl. No. 14/831,019.
Milne, J.R., "Algorithm for Presenting Media as Wallpaper for Portable and Non-Portable Devices," ip.com, Jul. 19, 2012, 5 pages.
Krautscheid, Oliver, "How to prevent changing desktop background and Windows 7 themes," Windows7themes.net, Jul. 10, 2014, 6 pages.
Advisory Action dated May 1, 2018 in U.S. Appl. No. 14/831,019.
English-language machine translation of JP2004-184161.
Fehily, Chris, "Visual QuickStart Guide: Microsoft Windows 7," Peachpit Press, Sep. 8, 2009, 2 pages.
English language machine translation of JPH05-189190.
English language machine translation of JP2002-170030.
English language machine translation of JP2002-216065.
English language machine translation of JP2008-033956.
English language machine translation of JP2013-016082.
English language machine translation of JP2013-200898.
English language machine translation of JP2013-235394.
English language machine translation of JP2014-095981.
Office Action and PTO-892 form dated Jul. 6, 2018 in U.S. Appl. No. 14/831,006 (40 pages).
Office Action (including List of Cited Documents) dated Jul. 31, 2018 in JP Application No. 2014-171366 (to which U.S. Appl. No. 14/831,006 claims priority) and English-language translation thereof (7 pages).
Office Action dated Dec. 4, 2018 in counterpart Japanese Patent Application No. 2014-0171365 and English-language translation.
Final Office Action dated Dec. 5, 2018 in U.S. Appl. No. 14/831,006.
English language machine translation of JP2002-215074.
Decision of Refusal dated Jun. 11, 2019 in counterpart Japanese Patent Application No. 2014-171365 and English-language translation including listing of prior art documents.
Notice of Reasons for Refusal dated Sep. 3, 2019 in Japanese Patent Application No. 2018-092381 and English-language translation including listing of prior art documents.
Office Action dated Jun. 20, 2019 in U.S. Appl. No. 16/149,504 and Form PTO-892.
English language machine translation of JP2010-087629.

* cited by examiner

FIG. 6

THEME TABLE

| THEME | BACKGROUND IMAGE | COLOR OF THE ICON | BGM | ... |
|---|---|---|---|---|
| GAME CHARACTER | IMAGE FILE A | WHITE | MUSIC FILE a | ... |
| ZOO | IMAGE FILE B | YELLOW | MUSIC FILE b | ... |
| AQUARIUM | IMAGE FILE C | BLUE | MUSIC FILE c | ... |
| ELECTRIC TRAIN | IMAGE FILE D | RED | MUSIC FILE d | ... |
| AUTOMOBILE | IMAGE FILE E | GREEN | – | ... |
| ⋮ | ⋮ | ⋮ | ⋮ | ⋮ |

FIG. 9

| | PERMISSION | INHIBITION |
|---|---|---|
| CHANGE OBJECT SETTING SCREEN | | |
| BACKGROUND IMAGE | ● | ○ |
| DESIGN OF ICONS | ● | ○ |
| ARRANGEMENT OF ICONS | ○ | ● |
| DESIGN OF WINDOW | ● | ○ |
| DESIGN OF SOFTWARE KEYBOARD | ● | ○ |
| BGM | ● | ○ |
| SOUND EFFECT | ● | ○ |
| VIBRATION PATTERN | ● | ○ |

OK    CANCEL

FIG. 12

USER INFORMATION

| USER ID | MACHINE ID | AUTOMATIC DISTRIBUTION PERMISSION OR NON-PERMISSION | AUTOMATIC DISTRIBUTION GENRE |
|---|---|---|---|
| USER A | MACHINE a | PERMISSION | GAME |
| USER B | MACHINE b | PERMISSION | ANIMAL |
| USER C | MACHINE c | NON-PERMISSION | — |
| ⋮ | ⋮ | ⋮ | ⋮ |

HOME SCREEN SETTINGS FOR INFORMATION PROCESSING DEVICE AND INFORMATION PROCESSING SYSTEM, AND RECORDING MEDIUM THEREFOR

CROSS-REFERENCE TO RELATED APPLICATIONS

This application is based upon and claims the benefit of priority of the prior Japanese Patent Application No. 2014-171365, filed on Aug. 26, 2014, the entire contents of which are incorporated herein by reference.

FIELD

The technology herein relates to an information processing device, an information processing system, and a recording medium used for performing processing of displaying a screen on a display unit.

BACKGROUND AND SUMMARY

In the conventional art, in an information processing device such as a game machine, a PC, a smartphone, and a tablet type terminal device, a screen is displayed in which icons or buttons are arranged for selection of an application or a folder to be started. For example, such a screen is referred to as a menu screen, a start screen, a home screen, and a desktop screen. Such a screen is displayed on a display unit when the device has been started, when given operation has been performed by a user, or in other situations.

According to an aspect of the embodiment, an information processing system includes: an information processing device including a display processing unit performing processing of displaying on a display unit a basic screen containing a selection image and a background image, the selection image being constructed from one or a plurality of images used for receiving selection operation, the background image serving as a background of the selection image; and a background image transmission device transmitting the background image of the basic screen, wherein the display processing unit of the information processing device automatically receives the background image transmitted by the background image transmission device and displays the received background image in the background of the selection image.

The object and advantages of the invention will be realized and attained by means of the elements and combinations particularly pointed out in the claims. It is to be understood that both the foregoing general description and the following detailed description are exemplary and explanatory and are not restrictive of the invention.

These and other objects, the features, the aspects, and the effects of the technology herein will become more clear from the following detailed description given with reference to the accompanying drawings.

BRIEF DESCRIPTION OF THE DRAWINGS

FIG. 6 is a schematic diagram illustrating an example of a theme table.

FIG. 9 is a schematic diagram illustrating an example of a change object setting screen.

FIG. 12 is a schematic diagram illustrating an example of user information stored in a server device.

DETAILED DESCRIPTION OF NON-LIMITING EXAMPLE EMBODIMENTS

<System Outlines>

Figure 1:
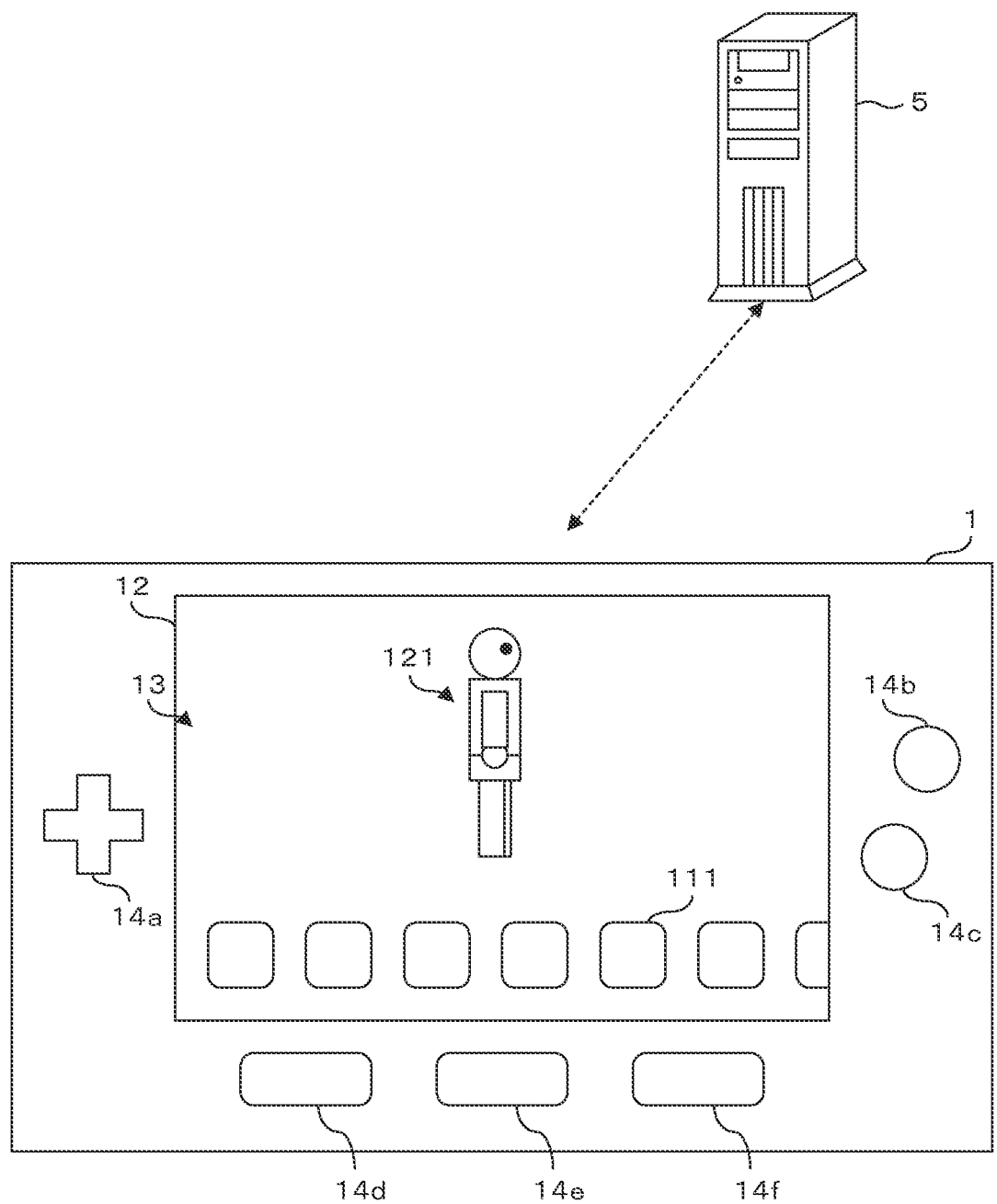
FIG. 1 is a schematic diagram used for describing outlines of an information processing system according to the present embodiment.

FIG. 1 is a schematic diagram used for describing the outlines of an information processing system according to the present embodiment. The information processing system according to the present embodiment includes one or a plurality of game machines 1 and a server device 5. Here, in the present embodiment, the configuration is described below in an example that the information processing device is constructed from the game machine 1 of portable type. However, employable information processing devices are not limited to this. For example, a similar configuration may be applied to various information processing devices such as a game machine of floor-standing type, a PC, a smartphone, and a tablet type terminal device.

The game machine 1 according to the present embodiment is contained in a housing having a substantially rectangular plate shape of a size allowed to be carried by a user. The game machine 1 includes: a display unit 12 arranged in a center of one wide surface (the front face) of the housing; a touch panel 13 provided on the display unit 12; and an operation unit 14 (14a to 14f) arranged in the surroundings of the display unit 12. The operation unit 14 is constructed from a plurality of buttons, switches, or the like. In the housing of the game machine 1, as the operation unit 14, a cross key 14a is provided on a left side relative to the display unit 12. Further, in the housing of the game machine 1, as the operation unit 14, two circular push buttons 14b and 14c are provided on a right side relative to the display unit 12. Further, in the housing of the game machine 1, as the operation unit 14, three quadrangular push buttons 14d to 14f are provided on a lower side relative to the display unit 12.

In the present embodiment, the quadrangular push button 14e located in the center among the three quadrangular push buttons 14d to 14f aligned horizontally to each other is assigned to a home button. The home button may be referred to otherwise as a menu button, a start button, or the like. When push operation to the home button is performed, the game machine 1 displays a home screen (a menu screen, a start screen, or the like) on the display unit 12. FIG. 1 illustrates a situation that the game machine 1 displays the home screen.

In addition to the situation that operation to the home button has been performed, the home screen of the game machine 1 is displayed at start of the game machine 1 or, at termination of an application or in other situations. The home screen according to the present embodiment has a configuration that a plurality of icons 111 are aligned in an appropriate arrangement. Here, in the home screen, in place of the icons 111, "buttons" or the like implementing a function of transition to another screen may be arranged. Each icon 111 is in a mode that an image of diverse kind is drawn on a base of substantially square shape. Each icon 111 is assigned to a function such as startup of an application, expansion of a folder, and display of a setting screen. In each icon 111, an image is drawn that causes the user to evoke the function. In the illustrated example, the plurality of icons 111 are displayed and aligned to each other horizontally in line in a lower part of the home screen.

The game machine 1 according to the present embodiment displays a given background image (a so-called wallpaper) in the background of the home screen. That is, the home screen according to the present embodiment contains: a selection image constructed from images such as one or a plurality of the icons 111, and a background image serving as the background of the selection image. The selection image may be constructed from one or a plurality of buttons or the like in place of the icons 111. That is, it is sufficient that the selection image is constructed from an image used for receiving selection operation performed by the user. The illustrated background image is an image in which a human-shaped character 121 who appears in a given game is drawn in a center.

The game machine 1 incorporates a speaker and outputs a BGM (Back Ground Music) through the speaker during the time that the home screen is displayed. When given operation has been performed in the touch panel 13 or, when operation to the operation unit 14 has been performed or in other situations, the game machine 1 outputs a given sound effect through the speaker. Here, the sound output such as a BGM and a sound effect through the speaker is allowed to be stopped in accordance with setting performed by the user. When an earphone, a headphone, or the like is connected to the game machine 1, the game machine 1 does not perform sound output through the speaker and performs sound output through the connected earphone, headphone, or the like.

The game machine 1 has a function of transmitting and receiving data to and from the server device 5 by wireless or cable communication through the Internet or the like or in a direct manner. Thus, the game machine 1 is allowed to download an application program such as a game, data for a given application program, or a content such as a video, a still image, and a music from the server device 5 and then use it.

With respect to display of the home screen, the game machine 1 according to the present embodiment performs the following processing.

Theme change
Animation of background image
Automatic change of background image
Automatic distribution of background image The "theme change" is a function that the user is allowed to collectively change a plurality of setting items concerning the configuration of the user interface in the home screen or the like. Theme indicates a so-called genre, type, category, kind, or the like. Theme indicates a given expression group such as the anime, the comic, the nature, the animal, the sport, and the game obtained by classification from a particular point of view. For example, in the information processing system according to the present embodiment, setting items concerning the user interface such as a background image of the home screen, a design of the icons 111 (or buttons or the like), arrangement of the icons 111 (or buttons or the like), a design of the software keyboard, a BGM, and a sound effect are collected into one group and then processed in relation to one theme. It is sufficient that such one theme contains at least one of the plurality of setting items described above. The user is allowed to select a theme in the setting screen or the like of the game machine 1. Then, the game machine 1 collectively changes the setting items related to the selected theme.

In the present information processing system, the server device 5 distributes the theme to the game machine 1. In the server device 5, data of a background image, a BGM, a sound effect and the like, a color setting and an arrangement setting of the icons 111, a color setting of the software keyboard, and the like serving as raw materials of a theme, are collected into one group and then stored as a theme. In response to a request from the game machine 1, the server device 5 collectively transmits to the game machine 1 the information related to the theme.

The "animation of background image" is a function that animation of the background image of the home screen is performed in accordance with operation performed in the home screen. In the home screen according to the present embodiment, in a case that the number of icons 111 is large such that the icons 111 are not allowed to be contained within one screen, the plurality of icons 111 are arranged and distributed to a plurality of pages. When operation directed to the right or left performed by using the cross key 14a or, operation that the position of contact to the touch panel 13 is moved in the right or left direction is received during display of the home screen, the game machine 1 performs page switching in the home screen. In the present embodiment, the above-described operation directed to the right or left is referred to as scroll operation. Then, the switching processing in the home screen performed in response to this operation is referred to as scroll processing. Here, the game machine 1 may have a configuration that the home screen is not switched page by page and a part of a long home screen extending in the right and left directions is extracted and displayed on the display unit 12. Then, in this configuration, the extraction position may be scrolled to the right or left in response to the scroll operation. The scroll directions are not limited to the right and left directions and may be other directions such as the up and down directions. The game machine 1 may have a configuration that the home screen is scrolled on the basis of an input from an inclination sensor, an illuminance sensor, a camera, or the like or, on the basis of the progress of time or the like.

In the game machine 1 according to the present embodiment, when scroll operation has been performed in the home screen so that the home screen is to be scrolled, animation of the background image of the home screen is performed. For example, in FIG. 1, the character 121 having an attitude of standing upright in a rightward direction is drawn in the background image. When the scroll operation directed to the right or left direction has been performed by the user, the game machine 1 performs animation such that the character 121 moves in the right or left direction (that is, moves forward or rearward). Here, for example, employable methods of implementing the animation include: a method of reproducing a video file such as an MPEG (Moving Picture Experts Group) file; and a method of successively displaying a plurality of still images prepared in advance. In this case, the number of frames per unit time in the animation and the smoothness of motion may be arbitrary. The game machine 1 may have a configuration that animation of the background image is performed in response to operation other than the scroll operation to the selection image, like tap operation, flick operation, determination operation of diverse kind, or the like.

The "automatic change of background image" is a function that when a given condition has been satisfied, the game machine 1 automatically changes the background image of the home screen. For example, when a given date and time has been reached, when a given achievement has been acquired in a game application, when a given game application has been executed within a given duration or for a longer time than a given time, or in other situations, the game machine 1 changes the background image.

The "automatic distribution of background image" is a function that the game machine 1 similarly changes automatically the background image of the home screen. When a given condition has been satisfied, the server device 5 distributes the background image to the game machine 1. Then, the game machine 1 having received this background image changes the background image.

<System Configuration>

Figure 2:
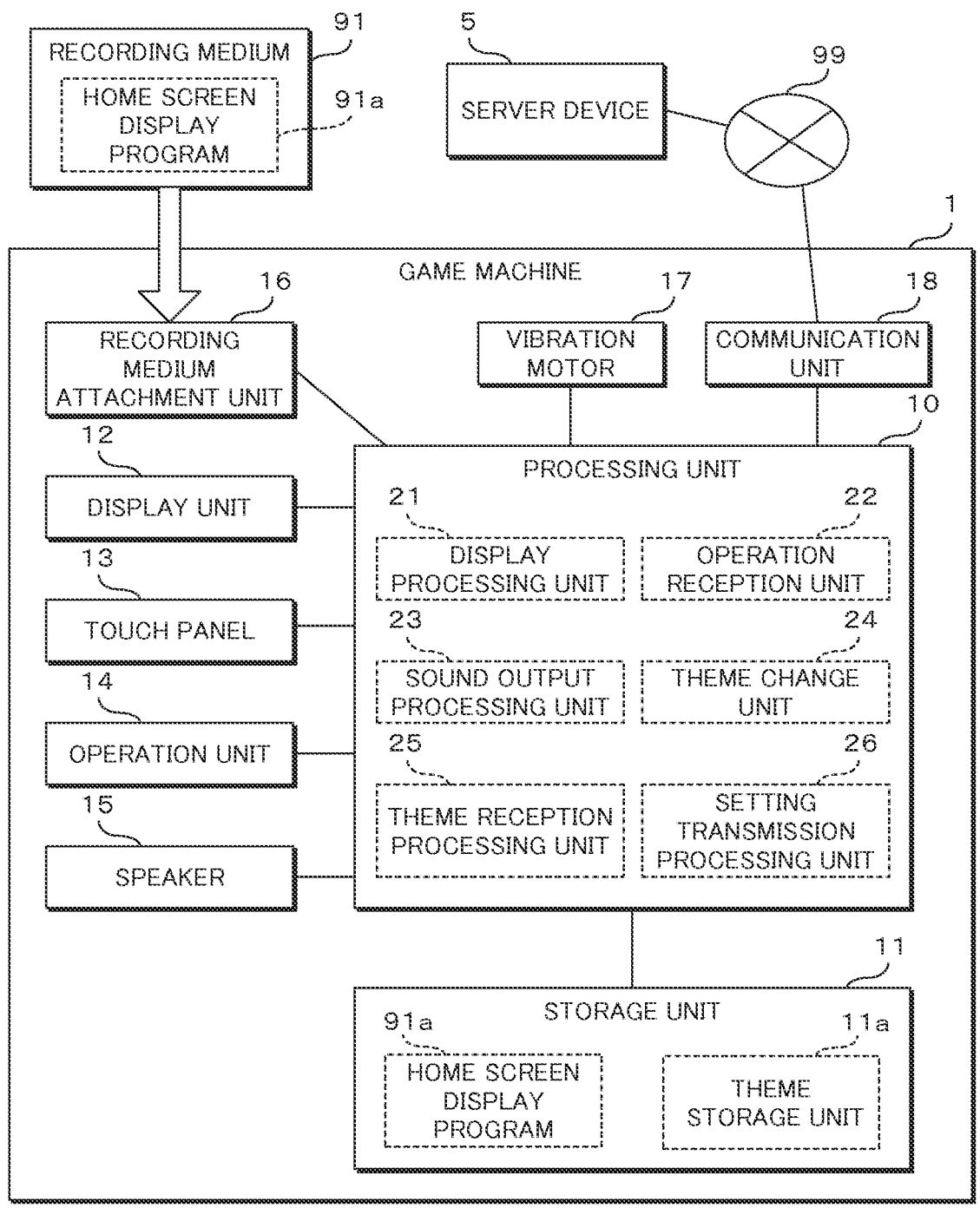
FIG. 2 is a block diagram illustrating a configuration of a game machine.

FIG. 2 is a block diagram illustrating the configuration of the game machine 1. The game machine 1 according to the present embodiment includes a processing unit (processor) 10, a storage unit 11, a display unit 12, a touch panel 13, an operation unit 14, a speaker 15, a recording medium attachment unit 16, a vibration motor 17, a communication unit 18, and the like. The processing unit 10 of the game machine 1 is constructed from an arithmetic processing device such as a CPU (Central Processing Unit). The processing unit 10 reads and executes a home screen display program 91a stored in the storage unit 11. By virtue of this, the processing unit 10 performs various kinds of information processing for displaying the home screen on the display unit 12. Here, for example, the home screen display program 91a may be contained in a program of the operating system or the like.

The storage unit 11 is constructed from a semiconductor memory device, a hard disk drive, or the like. The storage unit 11 stores therein various programs such as the home screen display program 91a and data required for execution of this program. In the storage unit 11, a theme storage unit 11a is provided that stores therein the data of the background image of the home screen, the BGM, and the like in a manner of being related to each theme.

The display unit 12 is constructed from a liquid crystal panel or the like and displays the image imparted from the processing unit 10. The touch panel 13 is provided in the surface of the display unit 12. The touch panel 13 receives contact operation to the display unit 12 performed by the user, that is, contact operation to the image displayed on the display unit 12. The touch panel 13 may adopt a method of diverse kind such as an electrostatic capacitance method and a resistance film method. When contact operation has been performed, the touch panel 13 notifies the processing unit 10 of the coordinate information of the contact position and the like.

The operation unit 14 includes the cross key 14a, the circular push buttons 14b and 14c, the quadrangular push buttons 14d to 14f and the like illustrated in FIG. 1. When operation has been performed by the user, the operation unit 14 imparts to the processing unit 10 a signal corresponding to the contents of the operation. For example, the operation contents are push or release of a button or the like. The speaker 15 performs sound output such as a BGM and a sound effect. The speaker 15 performs sound output on the basis of sound data or a sound signal imparted from the processing unit 10.

The recording medium attachment unit 16 is constructed such that a recording medium 91 of card type, cassette type, disk type, or the like is allowed to be attached and detached. The processing unit 10 reads the home screen display program 91a and various kinds of data from the recording medium 91 attached to the recording medium attachment unit 16, and then stores them into the storage unit 11. By virtue of this, installation, update, or the like of the home screen display program 91a to the game machine 1 is achieved. The processing unit 10 reads and executes the home screen display program 91a installed in the storage unit 11. Here, the installation, update, or the like of the home screen display program 91a may be performed through communication with the server device 5 (or another server device) through the communication unit 18.

The vibration motor 17 is a motor generating vibrations in the housing of the game machine 1 by means of revolution. The processing unit 10 controls revolution of the vibration motor 17 so as to control generation or stop of the vibrations and thereby is allowed to generate vibrations in various vibration patterns. The communication unit 18 transmits and receives information to and from the server device 5, another game machine 1, or the like, for example, through a network 99 such as the Internet. For example, the game machine 1 performs communication with the server device 5 through the communication unit 18 and thereby is allowed to download the background image of the home screen, the BGM, or the like.

In the game machine 1 according to the present embodiment, when the processing unit 10 executes the home screen display program 91a, a display processing unit 21, an operation reception unit 22, a sound output processing unit 23, a theme change unit 24, a theme reception processing unit 25, a setting transmission processing unit 26, and the like are implemented as software-based functional blocks by the processing unit 10. The display processing unit 21 performs processing of generating and displaying the home screen illustrated in FIG. 1 on the display unit 12. The operation reception unit 22 performs processing of, on the basis of the information imparted from the touch panel 13 and the operation unit 14, receiving various kinds of operation concerning the home screen performed by the user. For example, the operation reception unit 22 receives selection operation for an icon 111 in the home screen, scroll operation for the home screen, various kinds of setting operation concerning the home screen, and the like. The sound output processing unit 23 performs processing of outputting a BGM through the speaker 15 during display of the home screen, processing of outputting a sound effect through the speaker 15 in accordance with operation received by the operation reception unit 22, and the like. The sound output processing unit 23 appropriately reads the sound data stored in the theme storage unit 11a of the storage unit 11 and then outputs a BGM or a sound effect.

Theme change unit 24 performs processing of changing the theme of the home screen in accordance with operation performed by the user or, in an automatic manner. The theme reception processing unit 25 performs reception processing for the data concerning the theme transmitted from the server device 5. When the setting concerning the display mode of the home screen or the like has been performed by the user, the setting transmission processing unit 26 performs processing of transmitting to the server device 5 the contents of the setting.

Figure 3:
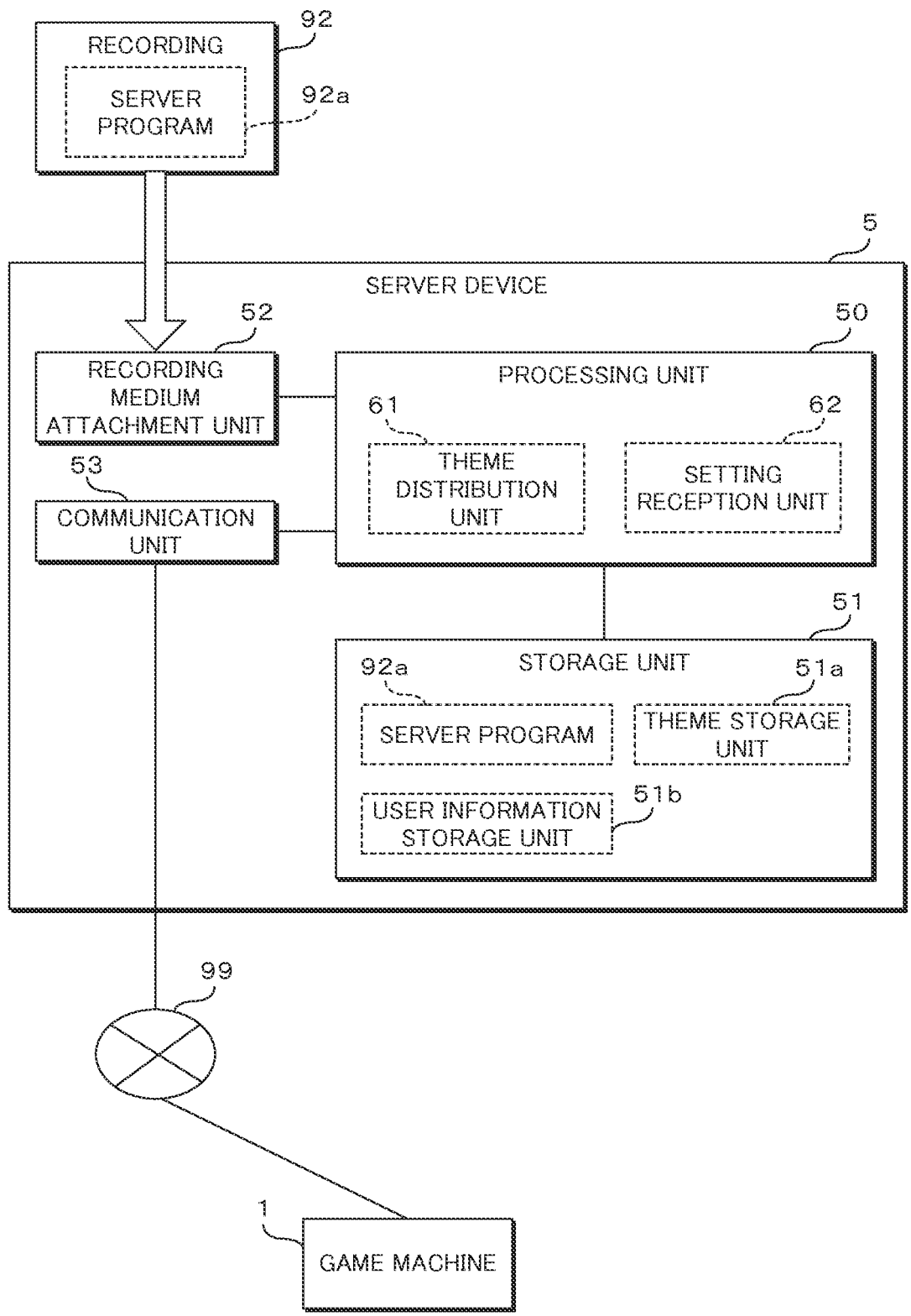
FIG. 3 is a block diagram illustrating a configuration of a server device.

FIG. 3 is a block diagram illustrating the configuration of the server device 5. The server device 5 according to the present embodiment includes a processing unit (processor) 50, a storage unit 51, a recording medium attachment unit 52, a communication unit 53, and the like. The processing unit 50 is constructed from an arithmetic processing device such as a CPU. The processing unit 50 reads and executes a server program 92a stored in the storage unit 51 so as to perform various kinds of processing concerning distribution of the theme. The storage unit 51 is constructed from a non-transitory storage device and allowed to store programs such as the server program 92a and various kinds of data. The storage unit 51 of the present embodiment includes: a theme storage unit 51a storing the data concerning the theme to be distributed to the game machine 1; a user information storage unit 51b storing the information concerning the user of the game machine 1, and the like.

The recording medium attachment unit 52 is constructed such that a recording medium 92 such as a disk type is allowed to be attached and detached. The processing unit 50 is allowed to read the server program 92a and other various kinds of data from a recording medium 92 attached to the recording medium attachment unit 52 and then install them in the storage unit 51. The communication unit 53 transmits and receives data to and from the game machine 1 or another server device through the network 99 such as the Internet.

In the server device 5 according to the present embodiment, when the processing unit 50 executes the server program 92a, a theme distribution unit 61, a setting reception unit 62, and the like are implemented as software-based functional blocks. The theme distribution unit 61 performs processing of, in response to a request from the game machine 1 or, in an automatic manner, distributing to the game machine 1 the data concerning the theme stored in the theme storage unit 51a. The setting reception unit 62 performs processing of receiving the setting information transmitted from the game machine 1 and then storing the received setting information into the user information storage unit 51b in accordance with the user ID or the like.

<Theme Change>

In the information processing system according to the present embodiment, when the theme of the home screen to be displayed on the display unit 12 by the game machine 1 is changed in accordance with the preference of the user, the setting items concerning the user interface of the home screen are allowed to be changed. In the present embodiment, the setting items concerning the interface related to the theme include the following ones.

Background image (wallpaper)
Design of icons 111
Arrangement of icons 111
Design of window
Design of software keyboard
BGM
Sound effect
Vibration pattern in vibration motor 17

Here, these are examples. That is, the theme may include items other than the above-described ones and may not include the above-described ones.

Here, in the present embodiment, the background image may include various images such as a two-dimensional image, a three-dimensional image, a still image and a video. The design of each icon 111 may include: the color and the shape of the base of the icon 111; the pattern drawn on the base; the size of the icon 111, and the like. The arrangement of the icons 111 indicates the display positions of the icons in the home screen. Each icon 111 may be stationary in the home screen or, may move within the home screen. In this case, the moving locus or the like is included in the arrangement of the icon 111. The design of the window may include the color and the shape of the window itself as well as the colors, the shapes, and the like of a tool bar, a status bar, a scroll bar, and various kinds of manual operation buttons arranged in the window. The software keyboard is a user interface image displayed on the display unit 12 by the game machine 1 in order that the user may perform character input in home screen, a setting screen displayed from the home screen or the like. The design of the software keyboard may include the color and the shape of the software keyboard as well as the key arrangement of the keyboard, the font of the characters described on each key, and the like. Here, the user interface image is not limited to a software keyboard and may be a hand drawing input pad or the like.

The BGM is a music or the like outputted through the speaker 15 by the game machine 1 during display of the home screen. The sound effect is a given sound outputted through the speaker when the user has performed operation to the touch panel 13 or the operation unit 14, when the game machine 1 has performed given processing in response to the operation, at the time of error occurrence, or in other situations. The vibration pattern is a pattern of vibrations generated in the housing of the game machine 1 by the vibration motor 17 when the game machine 1 has performed given processing like at the time that the game machine 1 has received an electronic mail.

Figure 4:
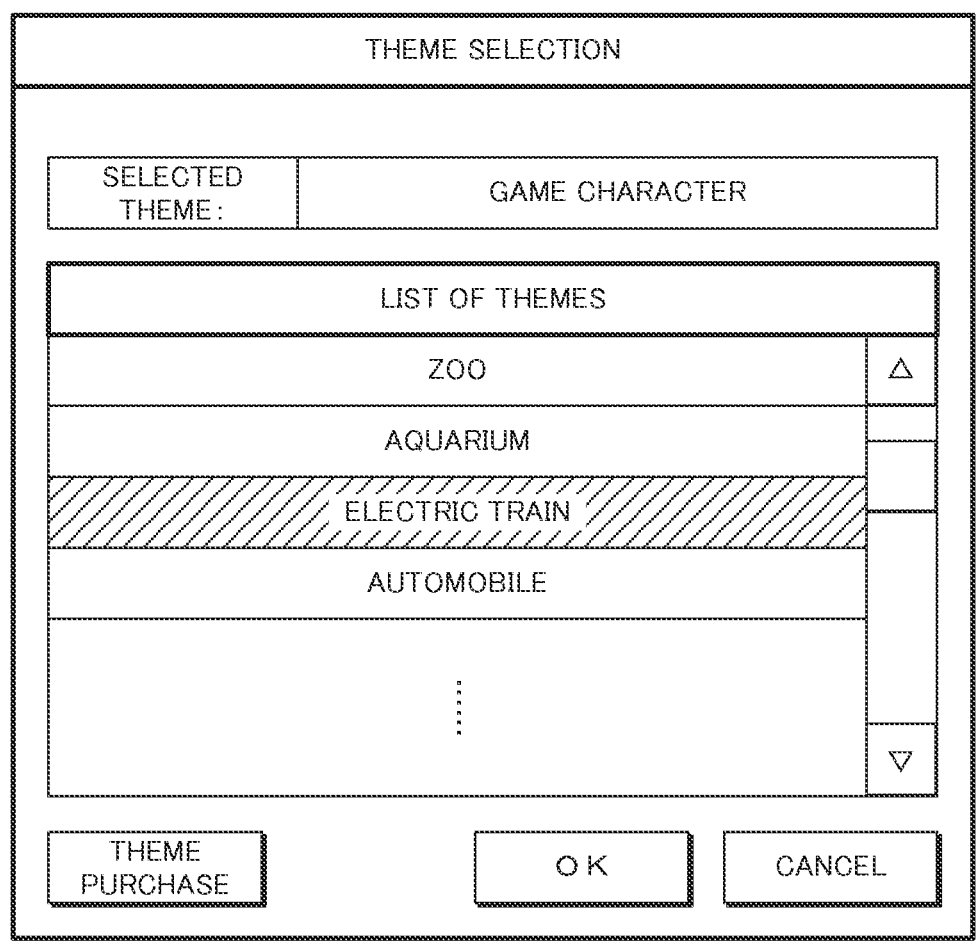
FIG. 4 is a schematic diagram illustrating an example of a theme selection screen.

In the home screen displayed on the display unit 12 by the game machine 1, an icon 111 for performing setting change of the theme is provided. When the user performs operation of selecting this icon 111 in the touch panel 13 or the operation unit 14, a theme selection screen is allowed to be displayed on the game machine 1. FIG. 4 is a schematic diagram illustrating an example of the theme selection screen. The operation reception unit 22 of the game machine 1 receives operation to the icon 111 for theme setting change and then displays on the display unit 12 the theme selection screen illustrated in the figure. In the present embodiment, the theme selection screen is displayed as a window in the home screen. The colors of the title part of the window (a rectangular region indicated as "theme selection" in FIG. 4), the inside and the frame part of the window, and the like are set forth in advance or in accordance with the theme set up at present.

The theme selection screen of the game machine 1 contains: a region indicating the name of the theme selected at present; a region displaying a list of the names of themes to which change is allowed; a theme purchase button; an OK button; and a cancel button. The illustrated example indicates a situation that the theme of game character is selected as the present theme. In the theme selection screen, in the list of themes to which change is allowed, the theme of zoo, the theme of aquarium, the theme of electric train, the theme of automobile, and the like are displayed in the form of list boxes allowed to be scrolled in the up and down directions. The theme selected in the theme list is displayed in a highlight manner. In the illustrated example, the theme of electric train is selected and hence the selected item is shaded in order to indicate highlight.

Figure 5:
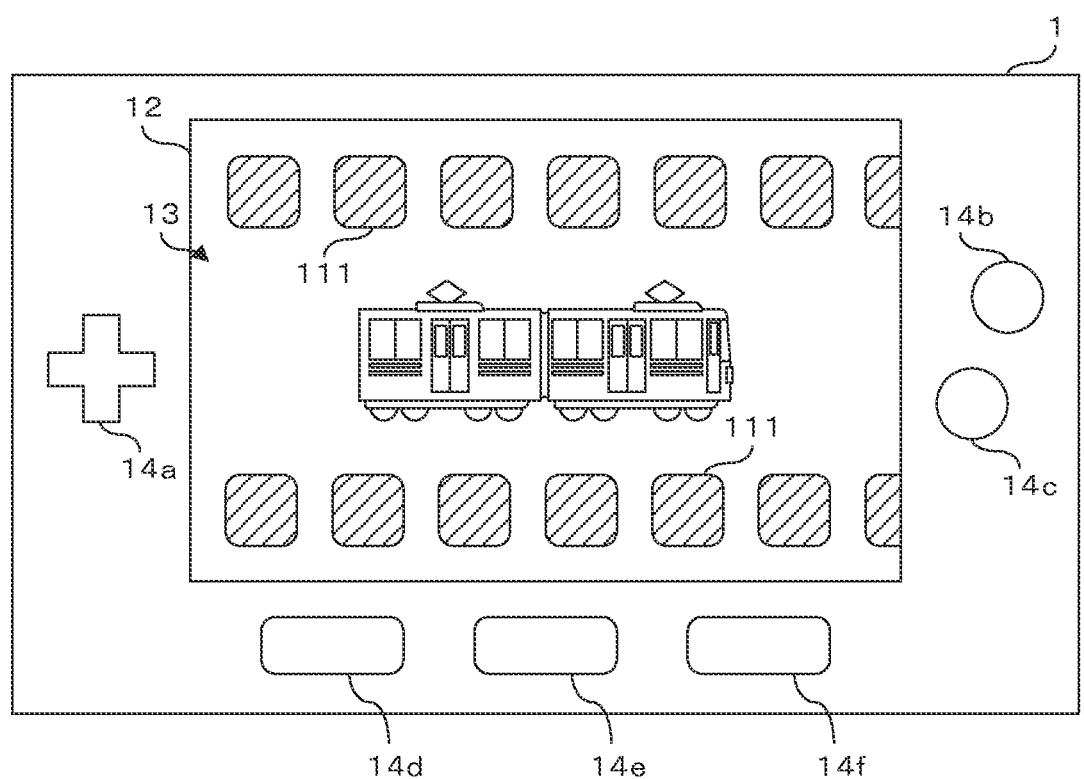
FIG. 5 is a schematic diagram used for describing theme change.

In a state that any theme has been selected in the theme list, when operation to the OK button of the theme selection screen is performed, the operation reception unit 22 of the game machine 1 receives the selected theme as the setting of a new theme. When the operation reception unit 22 has received the setting of the new theme, the theme change unit 24 of the game machine 1 performs change processing for the received theme. FIG. 5 is a schematic diagram used for describing theme change. FIG. 5 illustrates a situation that the theme change unit 24 has changed the theme of the home screen from the theme of game character illustrated in FIG. 1 to the theme of electric train selected in the theme selection screen illustrated in FIG. 4.

In the theme change unit 24 of the present example, as the background image corresponding to the theme of electric train, an image in which an electric train is drawn is displayed in the background of the home screen. The theme change unit 24 has changed the color of the bases of the icons 111 into a color corresponding to the theme of electric train. In the present figure, the corresponding regions are shaded so that the color difference is indicated. In the theme change unit 24, a plurality of the icons 111 are aligned in one line in each of an upper part and a lower part of the home screen such that the electric train of the background image is located in between. Although not illustrated, the theme change unit 24 changes the color of the window, the color of the software keyboard, or the like employed at the time that a window such as the theme selection screen is displayed, into a color corresponding to the theme of electric train. Further, the theme change unit 24 changes the BGM and the sound effect to be outputted through the speaker 15 during display of the home screen, into a BGM and a sound effect corresponding to the theme of electric train.

In the game machine 1, the settings of the background image, the color of the icons 111, and the like corresponding to each theme are stored as a theme table in the theme storage unit 11a of the storage unit 11. The theme storage unit 11a stores therein the data of the background image, the BGM, and the like. FIG. 6 is a schematic diagram illustrating an example of the theme table. In the theme table of the theme storage unit 11a, information such as the file name of the background image, the color setting of the icons 111, the file name of the BGM, and the like is stored in accordance with each theme. Here, not all items are to be set up for each theme. In the illustrated example, the item of BGM is not set up for the theme of automobile.

When operation to the OK button has been performed in the theme selection screen so that selection of the theme has been received, the theme change unit 24 refers to the theme table stored in the theme storage unit 11a. The theme change unit 24 acquires the settings of the background image, the color of the icons, and the like for the selected theme. The theme change unit 24 reads the image file of the background image for the selected theme from the theme storage unit 11a and then displays the read-out image as the background image of the home screen. The theme change unit 24 changes the color of the bases of the icons 111 in the home screen in accordance with the color setting of the icons 111 for the selected theme. The theme change unit 24 reads the music file of the BGM for the selected theme from the theme storage unit 11a and then outputs the BGM through the speaker 15.

Here, in the illustrated example, the BGM is not set up for the theme of automobile. When such a theme has been selected, the theme change unit 24 does not output a BGM through the speaker or, continues to use the BGM having been outputted in the theme prior to the change. Alternatively, the theme change unit 24 may output through the speaker a given BGM employed at the time that a theme is not applied. Similar situation holds also for the items other than the BGM.

When operation to the cancel button has been performed in the theme selection screen, the processing unit 10 of the game machine 1 closes the theme selection screen (causing the screen to be non-displayed) without changing the theme and then displays the home screen on the display unit 12. When operation to the theme purchase button has been performed in the theme selection screen, the processing unit 10 performs communication with the server device 5 through the communication unit 18 imparts to the server device 5 a purchase request for the theme. In response to the purchase request, the server device 5 transmits to the game machine 1 the list information or the like of the themes for sale. On the basis of the information received from the server device 5, the game machine 1 performs list display or the like of the themes allowed to be purchased. The game machine 1 receives selection operation of a theme to be purchased. When a theme has been selected, the game machine 1 performs given payment processing with the server device 5. After completion of the payment processing, the server device 5 transmits to the game machine 1 the information such as the image file of the background image, the music file of the BGM, and the color setting of the icons 111 corresponding to the purchased theme. The theme reception processing unit 25 of the game machine 1 receives the data corresponding to the theme from the server device 5 and then stores the data into the theme storage unit 11a of the storage unit 11. The theme reception processing unit 25 adds the information concerning the purchased theme to the theme table.

Figure 7:
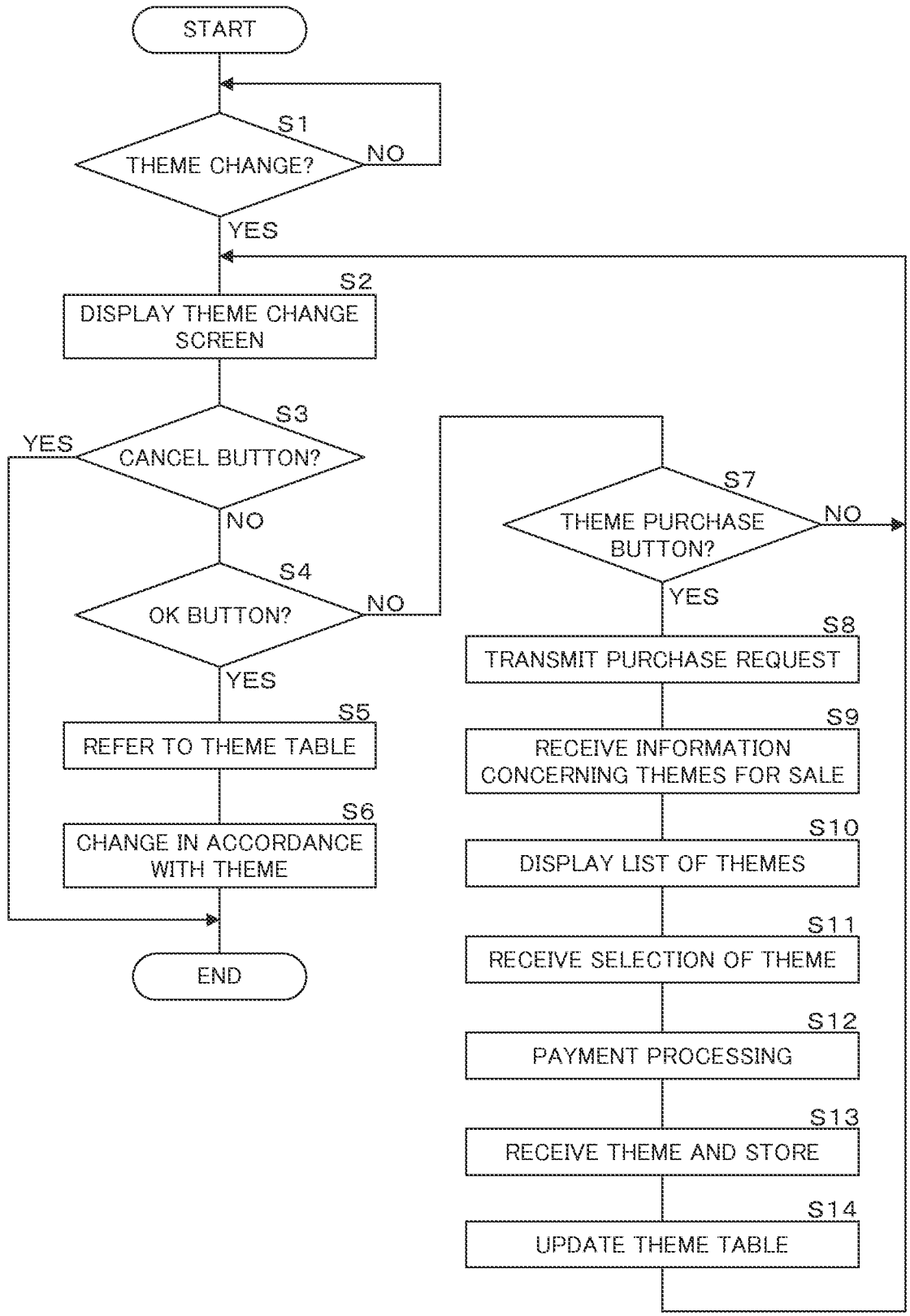
FIG. 7 is a flow chart illustrating a procedure of theme change processing for a home screen performed by a game machine.

FIG. 7 is a flow chart illustrating a procedure of theme change processing for the home screen performed by the game machine 1. For example, in accordance with whether the operation reception unit 22 has received operation to the icon 111 for theme change provided in the home screen, the processing unit 10 of the game machine 1 determines whether operation of theme change has been performed (step S1). If operation of theme change is not yet performed (S1: NO), the processing unit 10 waits until operation of theme change is performed. If operation of theme change has been performed (S1: YES), the display processing unit 21 of the processing unit 10 displays the theme change screen illustrated in FIG. 4 on the display unit 12 (step S2).

The processing unit 10 determines whether the operation reception unit 22 has received operation to the cancel button in the theme change screen (step S3). If operation to the cancel button has been received (S3: YES), the processing unit 10 terminates the processing without changing the theme. If operation to the cancel button is not yet received (S3: NO), the processing unit 10 determines whether the operation reception unit 22 has received operation to the OK button in the theme change screen (step S4). If operation to the OK button has been received (S4: YES), the theme change unit 24 of the processing unit 10 refers to the theme table of the theme storage unit 11a (step S5) and then acquires the data of the background image, the BGM, and the like related to the theme to which change is to be performed. By using the data acquired in accordance with the theme to which change is to be performed, the theme change unit 24 performs home screen change in accordance with the theme (step S6) and then terminates the processing.

If operation to the OK button is not yet received in the theme change screen (S4: NO), the processing unit 10 determines whether the operation reception unit 22 has received operation to the theme purchase button (step S7). If operation to the theme purchase button is not yet received (S7: NO), the processing unit 10 returns the processing to step S2. If operation to the theme purchase button has been received (S7: YES), the processing unit 10 transmits a purchase request for the theme through the communication unit 18 to the server device 5 (step S8). In response to this, the server device 5 transmits information such as the list of themes for sale, to the game machine 1 of requesting source.

The processing unit 10 of the game machine 1 receives through the communication unit 18 the information concerning the themes for sale transmitted from the server device 5 (step S9). On the basis of the information received from the server device 5, the display processing unit 21 of the processing unit 10 displays on the display unit 12 the list of themes allowed to be purchased (step S10). The operation reception unit 22 of the processing unit 10 receives selection of a theme to be purchased among the themes having been list-displayed (step S11). The processing unit 10 performs communication with the server device 5 through the communication unit 18 so as to perform payment processing concerning the theme to be purchased (step S12). After that, the server device 5 transmits to the game machine 1 the data of the background image, the BGM, and the like concerning the theme whose payment processing has been completed. The processing unit 10 of the game machine 1 receives the theme transmitted from the server device 5 and then stores the received theme into the theme storage unit 11a (step S13). On the basis of the received contents from the server device 5, the processing unit 10 updates the theme table of the theme storage unit 11a (step S14) and then returns the processing to step S2.

Figure 8:
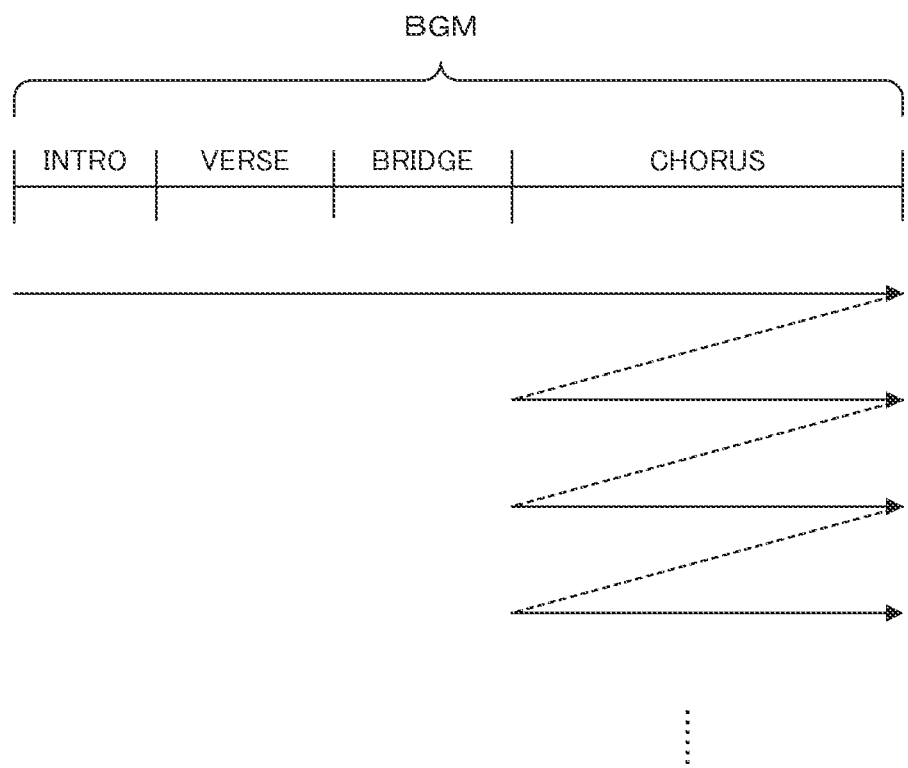
FIG. 8 is a schematic diagram used for describing repeat of a BGM performed by a sound output processing unit.

The sound output processing unit 23 of the game machine 1 according to the present embodiment repeatedly reproduces the BGM corresponding to the selected theme during display of the home screen. FIG. 8 is a schematic diagram used for describing the repeat of the BGM performed by the sound output processing unit 23. The sound output processing unit 23 according to the present embodiment is allowed to repeatedly reproduce a part alone of the BGM corresponding to the theme. For example, as illustrated in FIG. 8, the BGM is premised to consist of an Intro, a Verse, a Bridge part, and a Chorus. Then, at the time that the sound output processing unit 23 outputs the BGM at the first time after the home screen is displayed, the sound output processing unit 23 sequentially reproduces and outputs through the speaker 15 the Intro, the Verse, the Bridge, and the Chorus in this order. After the output of the Chorus has been completed, the sound output processing unit 23 repeatedly reproduces the Chorus alone of the BGM as long as display of the home screen is continued. Here, information concerning which part of the BGM is to be repeatedly reproduced may be stored in the theme table, may be contained in the music file of the BGM or, may be stored in a part other than these.

When operation performed by the user in the touch panel 13 or the operation unit 14 during display of the home screen has been received, the sound output processing unit 23 of the game machine 1 performs processing of outputting the sound effect corresponding to the theme through the speaker 15. The number of sound effects prepared in accordance with one theme is not limited to one. That is, a plurality may be prepared in accordance with one theme. The sound output processing unit 23 outputs through the speaker 15 the sound effect corresponding to the received operation contents. Thus, in the theme table, for each sound effect, a condition or the like for outputting the sound effect is stored. For example, the sound output processing unit 23 outputs through the speaker 15 the sound effect to be outputted when the home screen is displayed, the sound effect to be outputted when selection of an icon 111 has been performed, the sound effect to be outputted when the home screen is scrolled, the sound effect to be outputted when a warning message is displayed, or the like.

The processing unit 10 of the game machine 1 is allowed to cause the vibration motor 17 to operate at a given timing during display of the home screen or in other situations so as to impart vibrations to the housing of the game machine 1. For example, in a case that the game machine 1 has a function of transmitting and receiving an electronic mail, the processing unit 10 generates vibrations at the time of receiving an electronic mail. For example, in a case that a problem occurs in the processing of the game machine 1 or in other situations, the processing unit 10 is allowed to vibrate the housing together with a warning message. When the processing unit 10 appropriately changes the pattern such as the ON/OFF, the revolution speed, or the like of the vibration motor 17, the housing is allowed to be vibrated in various vibration patterns. As for the vibration pattern, for example, such an ON/OFF condition that 1-second ON, 0.5-second OFF, and 0.7-second ON, . . . for the vibration motor 17 is described in a file and then the file is stored in the theme storage unit 11a of the storage unit 11. In the theme table, the file name or the like of a vibration pattern is set up for each theme. Here, the number of vibration patterns prepared in accordance with one theme is not limited to one. That is, a plurality of vibration patterns may be prepared in accordance with one theme.

(Modification 1)

The game machine 1 described above has a configuration that the setting of a theme is received and then the background image, the BGM, and the like are changed. In contrast, in a game machine 1 according to Modification 1, in place of receiving the setting of a theme, the setting of a background image is received. When the setting of the background image has been changed, the theme change unit 24 of the game machine 1 checks the theme related to the newly set-up background image and then changes the BGM or the sound effect and the like corresponding to the theme. Thus, in the game machine 1 according to Modification 1, when the background image is changed, at least one of the BGM, the sound effect, and the like is changed.

(Modification 2)

The game machine 1 according to Modification 2 has a configuration that as for the setting of each of the background image, the BGM, and the like to be changed by the theme change unit 24 when the theme has been changed, the user is allowed to select the permission or non-permission of the change. When operation to the icon 111 for setting up change objects depending on the theme has been performed in the home screen, the display processing unit 21 of the game machine 1 according to Modification 2 displays a change object setting screen on the display unit 12. FIG. 9 is a schematic diagram illustrating an example of the change object setting screen. In the change object setting screen, for the individual setting items consisting of the background image, the design of the icons 111, the arrangement of the icons 111, the design of the window, the design of the software keyboard, the BGM, the sound effect, and the vibration pattern, whether setting change in association with the theme change is to be permitted or inhibited is allowed to be set up by using alternative radio buttons. When operation to the OK button of the change object setting screen has been performed, the operation reception unit 22 of the game machine 1 receives the change permission/inhibition of each item as a change object setting and then stores the received change object setting into the storage unit 11. When theme change has been performed, the theme change unit 24 of the game machine 1 refers to the change object setting stored in the storage unit 11 and then changes each item whose change is permitted.

(Modification 3)

In the game machine 1 according to Modification 3, when the theme of the home screen is changed, at least the group of the BGM and the sound effect is changed. Whether setting items other than the BGM and the sound effect are to be changed in association with the change of the theme is determined depending on each theme. As for the data of the BGM and the sound effect corresponding to the theme, data distributed by the server device 5 may be downloaded and then stored into the theme storage unit 11a of the storage unit 11. Here, the game machine 1 according to Modification 3 may have a configuration that when the background image is changed, at least the group of the BGM and the sound effect is changed.

(Modification 4)

In the game machine 1 according to Modification 4, when the theme of the home screen is changed, at least the group of the BGM or the sound effect and the vibration pattern of the vibration motor 17 is changed. Whether setting items other than the BGM, the sound effect, and the vibration pattern are to be changed in association with the change of the theme is determined depending on each theme. As for the data of the BGM, the sound effect, and the vibration pattern corresponding to the theme, data distributed by the server device 5 may be downloaded and then stored into the theme storage unit 11a of the storage unit 11. Here, the game machine 1 according to Modification 4 may have a configuration that when the background image is changed, at least the group of the BGM, the sound effect, and the vibration pattern is changed.

<Animation of Background Image>

The game machine 1 according to the present Embodiment 1 has a function of performing animation of the background image of the home screen in response to operation performed by the user. As described above, in the game machine 1, when scroll operation directed to the right or left direction is performed in the home screen, page switching or scroll to the right or left direction is performed in the home screen. The display processing unit 21 of the game machine 1 performs scrolling of the home screen and animation of the background image.

Figure 10:
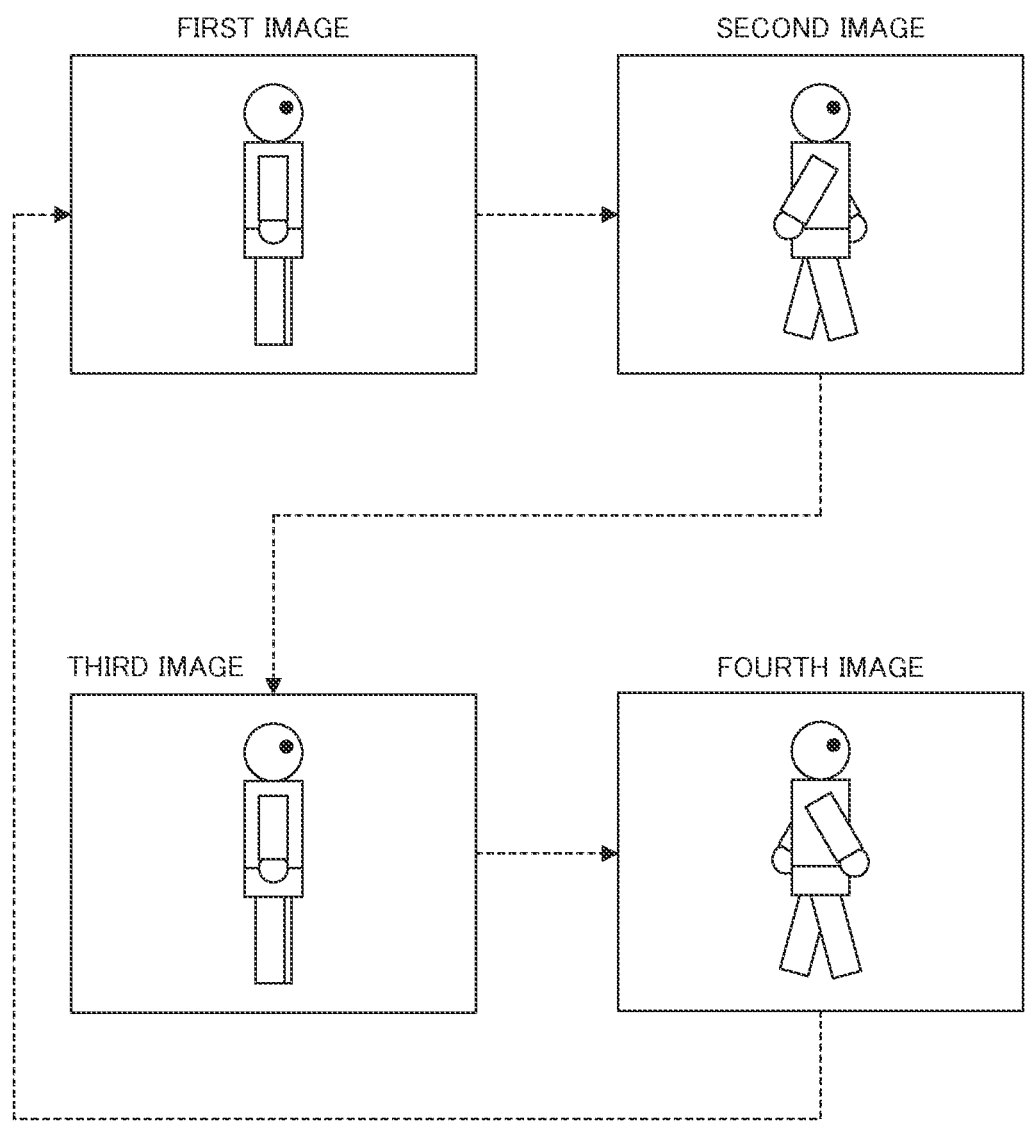
FIG. 10 is a schematic diagram used for describing animation of a background image.

FIG. 10 is a schematic diagram used for describing animation of the background image. The present example is described for a case that animation is performed on the character 121 of the background image illustrated in FIG. 1. Here, animation of the background image is not limited to that described in the present example and animation of various images may be employed. In the game machine 1 of the present example, the theme storage unit 11a stores four images consisting of a first image, a second image, a third image, and a fourth image each serving as a background image as illustrated in FIG. 10. In an initial state that the home screen is displayed on the display unit 12, the display processing unit 21 displays the first image as the background image of the home screen. As operation to touch panel 12 or the operation unit 14, when operation of scrolling the home screen rightward is received by the operation reception unit 22, the display processing unit 21 displays and switches the background images in the order of the first image→the second image→the third image→the fourth image→the first image . . . . This implements an animation that the character 121 of the background image walks rightward (moves forward). This is a so-called flip-book animation. When operation of scrolling the home screen leftward has been received, the display processing unit 21 displays and switches the background images in reverse order so that an animation is implemented that the character 121 walks leftward (moves rearward). Here, in the display processing unit 21, the images may be reversed right and left or, changed into other images, an animation may be implemented that the character 121 moves forward in the opposite direction in place of moving rearward. The display processing unit 21 adjusts the speed of switching the background images in accordance with the scroll speed of the home screen. That is, when the home screen is scrolled at a high speed, the display processing unit 21 switches the background images at high speed and, when the scroll is at a low speed, switches the background images at a low speed.

The sound output processing unit 23 of the game machine 1 outputs the sound effect through the speaker 15 when the home screen is scrolled to the right or left. In the present example, the sound output processing unit 23 outputs footstep sound of the character 121 as the sound effect. As described above, the speed of the animation of the character 121 varies corresponding to the scroll speed of the home screen. Thus, the sound output processing unit 23 adjusts the reproduction speed of the sound effect in accordance with the scroll speed of the home screen. Further, the sound output processing unit 23 may change the sound volume of the sound effect in accordance with the scrolling of the home screen. For example, the sound output processing unit 23 may gradually increase the sound volume of the sound effect. Then, the sound effect is outputted at a higher sound volume when the scrolling of the home screen is continued for a longer time. In the sound output processing unit 23, for example, the pitch, the waveform, or the like of the output sound may be changed.

As described above, when the theme of the home screen is changed, the background image of the home screen is changed into one corresponding to the theme. The animation of the background image performed by the display processing unit 21 is changed in accordance with the background image. For example, when the background image corresponding to the theme of electric train illustrated in FIG. 5 is displayed, in response to the scroll of the home screen directed to the right or left direction, the display processing unit 21 implements an animation that the electric train in the background image runs rightward or leftward. At that time, the sound output processing unit 23 outputs through the speaker 15 a running sound of the electric train as the sound effect.

That is, in the game machine 1 according to the present embodiment, when the user sets up a theme, a background image used for animation is allowed to be set up. Further, when the user sets up a theme, a sound effect to be outputted through the speaker 15 is allowed to be set up. However, in place of the configuration that the background image and the sound effect are changed in relation to the theme, the game machine 1 may have a configuration that the background image and the sound effect are allowed to be set up individually.

Here, as for the theme, animation of the background image may be not performed in some themes. In the theme table stored in the theme storage unit 11*a* of the game machine 1, set up are: whether animation of the background image is to be performed; and, in a case that animation is to be performed, the file name of a plurality of background images and the order of display of the background images. The display processing unit 21 refers to the theme table and thereby is allowed to be determined whether animation of the background image is to be performed.

The game machine 1 may have a configuration that animation of the background image and output of the sound effect are performed in response to operation other than the scroll operation. For example, in the game machine 1, animation of the background image and/or output of the sound effect may be performed in response to operation of performing expansion/reduction on an image or the like displayed on the display unit 12. For example, in the game machine 1, animation of the background image and/or output of the sound effect may be performed when the power button or the like is operated so that startup is performed or, when restoration is performed from a sleep state or the like. For example, in the game machine 1, animation of the background image and/or output of the sound effect may be performed when the display is changed from the screen of an application into the home screen in response to operation to the home button of the operation unit 14.

<Automatic Change of Background Image>

The game machine 1 according to the present embodiment has a function of, when a given condition has been satisfied, automatically changing the background image of the home screen. For example, the display processing unit 21 of the game machine 1 may have a configuration that the background image is changed at given times every day so that background images different from each other are displayed individually in the morning, the daytime, and the evening. For example, the display processing unit 21 may have a configuration that background images different from each other are displayed respectively on the individual days of the week. For example, the display processing unit 21 may have a configuration that the background image of a calendar is changed on the first day of each month. For example, the display processing unit 21 may have a configuration that when the accumulated time of displaying the background image exceeds a given time, the background image is changed into another one. As such, the display processing unit 21 may have a configuration that the background image is changed in accordance with a condition concerning the date and time.

In the display processing unit 21, the background image of the home screen may be changed in accordance with the play status of the game in a given game application. For example, the display processing unit 21 may have a configuration that the background image is changed in corresponding to the advancement of the story in a role playing game or an adventure game. For example, the display processing unit 21 may have a configuration that the background image is changed in accordance with the achievement acquired in an action game or a puzzle game. For example, the display processing unit 21 may have a configuration that the background image is changed when the accumulated time of having played a game application exceeds a given time.

The data used for the change by the background image displaying processing unit 21 is stored in the theme storage unit 11*a*. In the theme table of the theme storage unit 11*a*, set up are: whether automatic change of the background image is to be performed; and, in a case that the automatic change is to be performed, a condition therefor, the file name of a background image used for the change, and the like. When there are a plurality of background images to which change is allowed, for example, the display processing unit 21 may select one background image in accordance with a random number or, may switch the plurality of background images in a given order.

Further, in the game machine 1 according to the present embodiment, at least one of the setting items like the design of the icons 111, the design of the window, the BGM or the sound effect, and the like allowed to be changed as a theme is allowed to be automatically changed together with the background image. Which setting item is to be automatically changed together with the background image is stored in the theme table. When a given condition has been determined as being satisfied, the processing unit 10 of the game machine 1 reads another background image from the theme storage unit 11*a* and then displays the image as the background of the home screen. At that time, the processing unit 10 refers to the theme table so as to check the setting items to be changed, then reads required data from the theme storage unit 11*a*, and then performs setting change.

Figure 11:
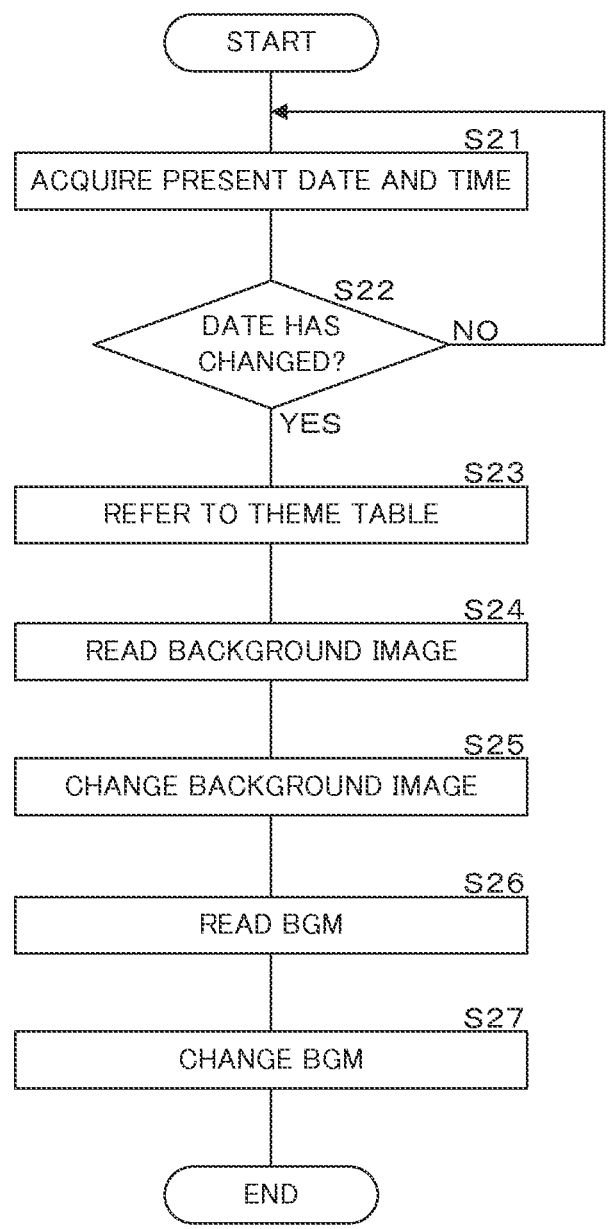
FIG. 11 is a flow chart illustrating a procedure of automatic change processing performed by a game machine.

FIG. 11 is a flow chart illustrating a procedure of automatic change processing performed by the game machine 1. The present flow chart illustrates processing performed in a configuration that the game machine 1 automatically changes the background image and the BGM with adopting as the given condition a situation that the date has changed. The processing unit 10 of the game machine 1 acquires the present date and time by using an internal timer function or the like (step S21). The processing unit 10 compares the date and time acquired at step S21 with the date and time having been acquired before and then determines whether the date has changed (step S22). If the date has not yet changed (S22: NO), the processing unit 10 returns the processing to step S21.

If the date has changed (S22: YES), the theme change unit 24 of the processing unit 10 refers to the theme table of the theme storage unit 11*a* (step S23) so as to acquire information concerning the background image and the BGM to which change is to be performed. The theme change unit 24 reads from the theme storage unit 11*a* the data of the background image to which change is to be performed (step S24). The theme change unit 24 changes the background of the home screen into the read-out background image (step S25). The theme change unit 24 reads from the theme storage unit 11*a* the data of the BGM to which change is to be performed (step S26). The theme change unit 24 changes the BGM of the home screen into the read-out BGM (step S27) and then terminates the processing.

In the present embodiment, the game machine 1 had a configuration that when a given condition has been determined as being satisfied, the background image and at least one of the setting items other than this are automatically changed. However, employable configurations are not limited to this. The automatic change processing performed when a given condition has been satisfied may be performed by a method other than this. For example, methods described in the following modifications may be employed.

(Modification 5)

In the game machine 1 according to Modification 5, when a given condition has been satisfied, the theme of the home screen is automatically changed. When a given condition has been determined as being satisfied, the theme change unit 24 of the game machine 1 refers to the theme table of the theme storage unit 11*a* so as to select one theme other than the theme set up at that time. The theme change unit 24 performs setting change of these such that the background image, the color of the icons 111, the BGM, and the like corresponding to the selected one theme are implemented. At the time that the theme change unit 24 selects the one theme from the plurality of themes, for example, the one theme may be selected in accordance with a random number or, the one theme may be selected in a given order.

The game machine 1 may have a configuration that a genre setting for the themes adopted as the objects of automatic change is received from the user. In this case, a genre is set forth for each theme. For example, for the theme of electric train, the theme of automobile, and the like, a genre of vehicles may be set forth. For example, for the theme of dog, the theme of cat, and the like, a genre of animals may be set forth. The genre of each theme is stored as additional information in the theme table. For example, when operation to the icon 111 for genre setting of automatic change has been performed in the home screen, the processing unit 10 of the game machine 1 displays a genre selection screen on the display unit 12. Here, although not illustrated, the configuration of the genre selection screen may be similar to that of the theme selection screen illustrated in FIG. 4. The operation reception unit 22 of the game machine 1 receives the selection of a genre performed by the user in the genre selection screen and then stores into the storage unit 11 the received genre as the genre setting of automatic change. When a given condition has been satisfied, the theme change unit 24 of the game machine 1 reads the genre setting stored in the storage unit 11, then selects the theme of the set-up genre, and then changes the theme.

(Modification 6)

The game machine 1 according to Modification 6 has a configuration that the above-described function of changing the background image or the like in accordance with the theme is not provided. In the game machine 1 according to Modification 6, a genre is set up for each background image. The processing unit 10 of the game machine 1 receives a genre setting of automatic change from the user and stores it into the storage unit 11. Then, when a given condition has been satisfied, the processing unit 10 selects a background image of the set-up genre and then displays the selected image in the background of the home screen. In the game machine 1 according to Modification 6, a genre is set up also for the BGM, the sound effect, and the like. Then, when the background image is changed, at least one of the setting items of the BGM or the sound effect and the like is changed.

At the time that the one background image is selected from the plurality of background images, for example, the processing unit 10 of the game machine 1 according to Modification 6 may select the one background image in accordance with a random number or, may select the one background image in a given order. At the time that the setting items of the BGM or the sound effect and the like to be changed together with the background image are selected, for example, the processing unit 10 may select one setting item in accordance with a random number or, a setting item to be changed together with each background image may be determined in advance.

(Modification 7)

In the game machine 1 according to Modification 7, after a given condition has been satisfied so that automatic change of the background image or the like has been performed, when a second condition has further been satisfied, the home screen is returned to the state prior to the automatic change. For this purpose, when automatic change of the background image or the like has been performed, the theme change unit 24 of the game machine 1 according to Modification 7 stores the state prior to the change into the storage unit 11. After the automatic change, when the second condition has been satisfied, the theme change unit 24 reads the state prior to the automatic change stored in the storage unit 11 and then restores the background image and the like of the home screen into the original state. For example, the game machine 1 may automatically change the background image or the like during a particular limited period like from 5:00 p.m. to 9:00 p.m. In this case, in the game machine 1, automatic change is performed with adopting as the first condition a situation that 5:00 p.m. has been reached, and then restoration is performed with adopting as the second condition a situation that 9:00 p.m. has been reached.

<Automatic Distribution of Background Image>

The information processing system according to the present embodiment has a function that the background image of the home screen is automatically distributed from the server device 5 to each game machine 1. The operation reception unit 22 of the game machine 1 receives settings concerning whether automatic distribution from the server device 5 is permitted and concerning the genre of the background image whose automatic distribution is to be received. The settings of the permission or non-permission of automatic distribution and of the genre received by the operation reception unit 22 are transmitted from the setting transmission processing unit 26 of the game machine 1 to the server device 5. The setting reception unit 62 of the server device 5 receives from the game machine 1 the settings concerning automatic distribution and then stores the settings for each user into the user information storage unit 51*b* of the storage unit 51.

FIG. 12 is a schematic diagram illustrating an example of the user information stored in the server device 5. In the user information stored into the user information storage unit 51*b* by the server device 5, information such as a game machine ID, automatic distribution permission or non-permission, and an automatic distribution genre is stored in accordance with the user ID. The user ID indicates identification information imparted uniquely to each user. The game machine ID indicates identification information imparted uniquely to each game machine. When the present information processing system is to be used, the user registers on the server device 5 the game machine 1 used by oneself. The server device 5 stores the game machine ID of the registered game machine 1, in accordance with the user ID of the user who has performed registration.

The automatic distribution permission or non-permission in the user information indicates the setting of permission or non-permission of automatic distribution of the background image performed by each user, and hence either permission or non-permission is set up. The automatic distribution genre indicates information specifying a genre of the background image to be distributed when automatic distribution is permitted. As for the automatic distribution permission or non-permission and the automatic distribution genre, the settings thereof are received by each game machine 1 and then transmitted from the game machine 1 to the server device 5. The setting reception unit 62 of the server device 5 stores the settings received from the game machine 1, in accordance with the game machine ID of the game machine 1.

In the server device 5, the theme storage unit 51*a* of the storage unit 51 stores the background image to be automatically distributed to the game machine 1 and the condition for automatic distribution of this background image. For example, the background image and the automatic distribution condition may be generated or prepared by an administrator or the like of the server device 5. For example, the automatic distribution condition contains information concerning: the date and time at which the background image is to be distributed; the genre of this background image; and the like.

The processing unit 50 of the server device 5 determines whether the automatic distribution condition of the background image has been satisfied. Then, when the condition has been satisfied, the processing unit 50 performs automatic distribution of the background image. For example, the theme distribution unit 61 of the processing unit 50 determines whether the date and time set up as the automatic distribution condition has been reached. Then, when the set-up date and time has been reached, the theme distribution unit 61 distributes the background image to the game machine 1 of the user who has permitted the automatic distribution of the background image of the genre set up in the distribution condition.

The background image distributed from the server device 5 is received by the game machine 1 of the user who has permitted automatic distribution of the genre of this background image. In the theme reception processing unit 25 of the game machine 1, the background image received from the server device 5 is stored into the theme storage unit 11*a*. The theme change unit 24 of the game machine 1 changes the background image of the home screen into the received background image.

Figure 13:
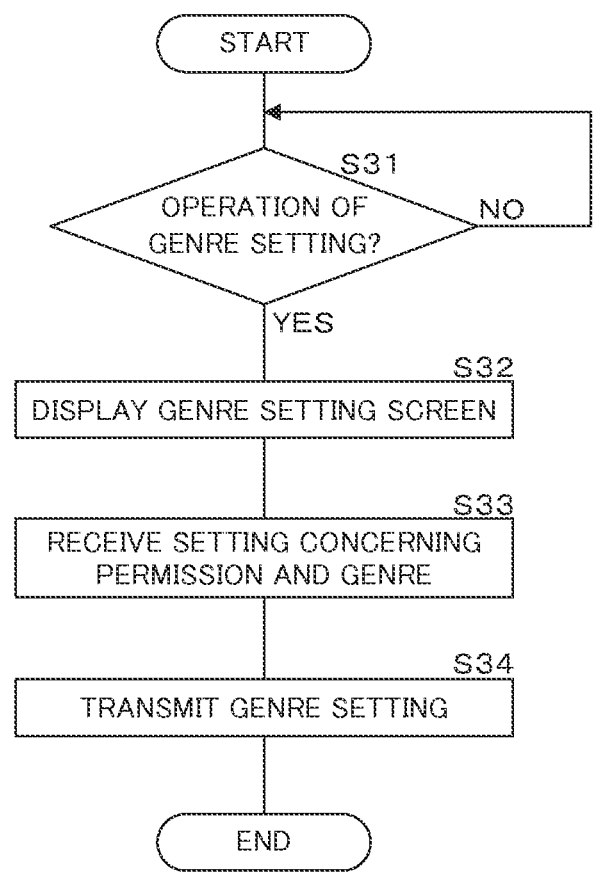
FIG. 13 is a flow chart illustrating a procedure of genre setting reception processing for automatic distribution performed by a game machine.

FIG. 13 is a flow chart illustrating a procedure of genre setting reception processing for automatic distribution performed by the game machine 1. For example, in accordance with whether the operation reception unit 22 has received operation to the icon 111 for genre change provided in the home screen, the processing unit 10 of the game machine 1 determines whether operation of genre setting has been performed (step S31). If operation of genre setting is not yet performed (S31: NO), the processing unit 10 waits until operation of genre setting is performed. If operation of genre setting has been performed (S31: YES), the display processing unit 21 of the processing unit 10 displays a genre setting screen (not illustrated) on the display unit 12 (step S32). The operation reception unit 22 of the processing unit 10 receives in the displayed genre setting screen the settings concerning the permission or non-permission automatic distribution and the genre whose automatic distribution is permitted (step S33). The processing unit 10 transmits the genre setting received by the operation reception unit 22, to the server device 5 through the communication unit 18 (step S34) and then terminates the processing.

Figure 14:
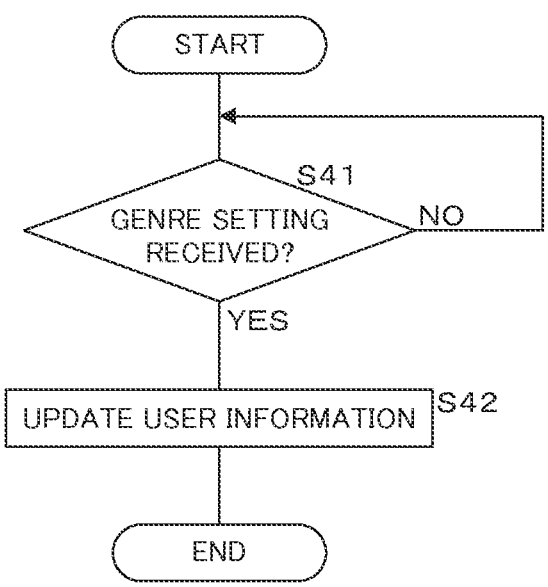
FIG. 14 is a flow chart illustrating a procedure of genre setting reception processing performed by a server device.

FIG. 14 is a flow chart illustrating a procedure of genre setting reception processing performed by the server device 5. The setting reception unit 62 of the server device 5 determines whether setting concerning the genre of automatic distribution has been received from the game machine 1 (step S41). If a genre setting is not yet received (S41: NO), the setting reception unit 62 waits until a genre setting is received. If a genre setting has been received (S41: YES), the setting reception unit 62 updates the user information stored in the user information storage unit 51*b* so that the received genre setting is reflected (step S42), and then terminates the processing.

Figure 15:
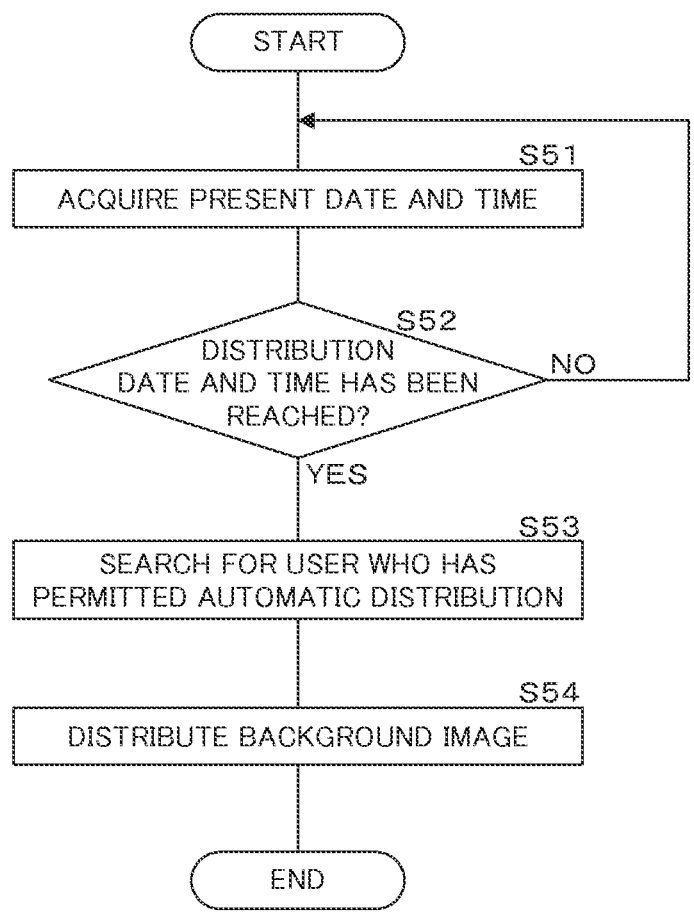
FIG. 15 is a flow chart illustrating a procedure of automatic distribution processing for a background image performed by a server device.

FIG. 15 is a flow chart illustrating a procedure of automatic distribution processing for the background image performed by the server device 5. The present flow chart illustrates processing performed in a configuration that the server device 5 distributes the background image to the game machine 1 with adopting as the distribution condition a situation that a given distribution date and time has been reached. The theme distribution unit 61 of the server device 5 acquires the present date and time by using an internal timer function or the like (step S51). On the basis of the acquired date and time, the theme distribution unit 61 determines whether the date and time set up as the distribution condition has been reached (step S52). If the distribution date and time is not yet reached (S52: NO), the theme distribution unit 61 returns the processing to step S51. If the distribution date and time has been reached (S52: YES), the theme distribution unit 61 refers to the user information stored in the user information storage unit 51*b* so as to searches for a user who has permitted the automatic distribution of the genre of the background image serving as the distribution object (step S53). The theme distribution unit 61 distributes the background image to the game machine 1 corresponding to the user having been found (step S54) and then terminates the processing.

Figure 16:
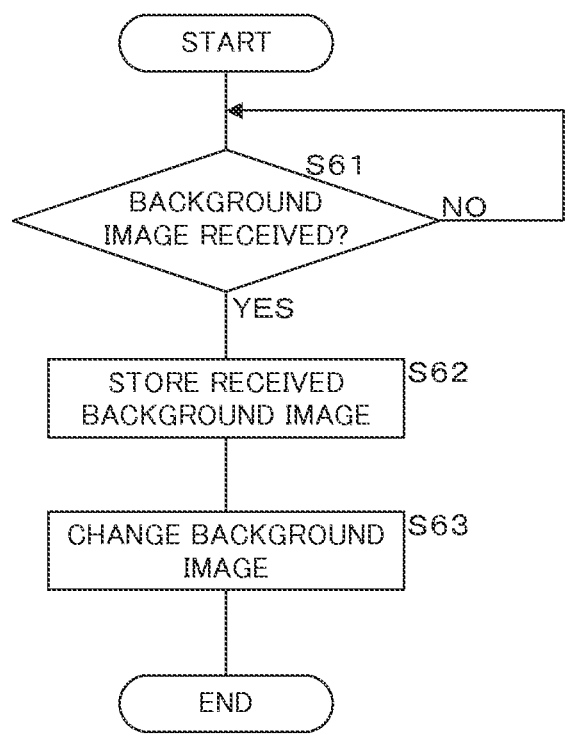
FIG. 16 is a flow chart illustrating a procedure of automatic reception processing for a background image performed by a game machine.

FIG. 16 is a flow chart illustrating a procedure of automatic reception processing for a background image performed by the game machine 1. The theme reception processing unit 25 of the game machine 1 determines whether the communication unit 18 has received a background image automatically distributed from the server device 5 (step S61). If a background image is not yet received (S61: NO), the theme reception processing unit 25 waits until a background image is received. If a background image has been received (S61: YES), the theme reception processing unit 25 stores the received background image into the theme storage unit 11*a* (step S62). The theme change unit 24 of the game machine 1 changes the background image of the home screen into the background image newly received from the server device 5 (step S63) and then terminates the processing.

The information processing system in the present embodiment had a configuration that the server device 5 automatically distributes a background image in accordance with a genre set up by a user by using the game machine 1. However, employable configurations are not limited to this. Automatic distribution by the server device 5 may be performed by a method other than this. For example, methods described in the following modifications may be employed.

(Modification 8)

In the information processing system according to Modification 8, in place of the configuration that the server device 5 distributes the background image in accordance with a set-up genre, the server device 5 distributes the background image in accordance with a set-up theme. When the operation reception unit 22 has received the setting of a theme of the home screen, the processing unit 10 of the game machine 1 transmits to the server device 5 the theme setting received by the setting transmission processing unit 26. In the server device 5, the user information storage unit 51*b* of the storage unit 51 stores the theme of automatic distribution for each user in place of the automatic distribution genre illustrated in FIG. 12. The setting reception unit 62 of the server device 5 receives the theme setting transmitted from the game machine 1 and then performs processing of stored in the user information storage unit 51*b*.

In the server device 5 according to Modification 8, for example, information containing a distribution date and time, a theme of the background image, and the like are set up as the automatic distribution condition of the background image. When the distribution date and time set up in the automatic distribution condition has been reached, the theme distribution unit 61 of the server device 5 refers to the user information stored in the user information storage unit 51*b* and thereby distributes the background image to the game machine 1 of the user who has permitted the automatic distribution of the background image of the theme set up in the automatic distribution condition.

(Modification 9)

In the information processing system according to Modification 9, for example, the server device 5 performs automatic distribution of the BGM or the sound effect and the like in addition to the background image. At the time that the automatic distribution condition has been satisfied so that the background image is distributed to the game machine 1, the theme distribution unit 61 of the server device 5 according to Modification 9 collectively distributes the BGM or the sound effect and the like corresponding to the background image, to the game machine 1. The theme change unit 24 of the game machine 1 having received the background image, the BGM or the sound effect, and the like distributed from the server device 5 changes the background image of the home screen into the received background image and, at the same time, changes the BGM or the sound effect and the like of the home screen into the received ones.

(Modification 10)

In the information processing system according to Modification 10, the server device 5 performs automatic distribution of the theme. In the server device 5 according to Modification 10, the theme storage unit 51*a* stores the theme to be automatically distributed to the game machine 1 and the condition for automatic distribution of this theme. When the date and time set up as the automatic distribution condition has been reached, the theme distribution unit 61 of the server device 5 distributes the theme to the game machine 1 of the user who has permitted the automatic distribution of the theme of the genre set up in the automatic distribution condition. For example, the theme to be distributed may contain at least one of the background image, the BGM, the sound effect, and the like.

(Modification 11)

The information processing system according to Modification 11 has a configuration that the user is not allowed to set up the permission or non-permission of automatic distribution of the background image. Thus, in the server device 5 according to Modification 11, the user information stored in the user information storage unit 51*b* does not contain the item of automatic distribution permission or non-permission. For example, when the condition such as the distribution date and time has been satisfied, the server device 5 transmits the background image forcedly to the game machine 1 whose communication is available. The background image transmitted from the server device 5 is automatically received by the game machine 1 and then displayed as the background image of the home screen. Here, at the first time of distribution, the server device 5 may inquire of the game machine 1 for the permission or non-permission of forced distribution. Then, after that, the server device 5 may distribute the background image forcedly to the game machine 1 alone having imparted the permission.

(Modification 12)

In place of the configuration that the user sets up the genre of the background image to be automatically distributed, the information processing system according to Modification 12 has a configuration that the server device 5 automatically determines the genre of the background image to be automatically distributed. For example, the server device 5 acquires history information of Internet access performed by using the browser function of the game machine 1 and thereby determines the favorite genre of the user using the game machine 1. The server device 5 stores the determined genre into the user information and then distributes the background image of this genre to the game machine 1. Here, in place of the configuration that the server device 5 automatically determines the genre, a configuration may be employed that an administrator or the like of the server device 5 determines and sets up the genre of the background image to be distributed to each game machine 1.

(Modification 13)

The information processing system according to the embodiment given above had a configuration that the server device 5 itself determines the timing and distributes the background image and then the game machine 1 automatically receives the background image. This configuration is of so-called push-based information distribution. In contrast, in the information processing system according to Modification 13, the game machine 1 itself determines the timing and automatically imparts a distribution request for the background image to the server device 5 and then, in response to the distribution request, the server device 5 distributes the background image to the game machine 1. That is, the information processing system according to Modification 13 has a configuration that pull-based information distribution is automatically performed.

The information processing system according to Modification 13 may have a configuration that the game machine 1 determines whether the condition for automatic distribution of the background image has been satisfied. The setting of permission or non-permission of automatic distribution may be administered in each game machine 1. The information concerning the automatic distribution genre may be stored in any one of the game machine 1 and the server device 5. In a case that the game machine 1 stores the automatic distribution genre, it is sufficient that the information concerning the automatic distribution genre is added to the distribution request for the background image from the game machine 1 to the server device 5.

<Summary>

In the information processing system according to the present embodiment having the above-described configurations, the display processing unit 21 of the game machine 1 displays on the display unit 12 the home screen in which one or a plurality of the icons 111 are arranged. In the game machine 1, the operation reception unit 22 receives the setting of a theme of the home screen through the touch panel 13 or the operation unit 14. The present information processing system collects into a group the settings of the home screen, the background image, the BGM, the sound effect, the design of the icons 111, the arrangement of the icons 111, the design of the window, the design of the software keyboard, the vibration pattern of the vibration motor 17, and the like and then administers the group as a theme. In accordance with the setting of the theme received by the operation reception unit 22, the theme change unit 24 of the game machine 1 collectively changes one or a plurality of the settings corresponding to the theme.

By virtue of this, in the information processing system according to the present embodiment, the external appearance of the home screen and the like are allowed to be changed by easy operation. Further, since a plurality of setting items are changed in a linked manner, the aesthetic appearance, the designed variety, and the like of the home screen are expected to be improved.

In the game machine 1 according to the present embodiment, the change object setting screen may be displayed on the display unit 12 and then the operation reception unit 22 may receive from the user the selection of setting items to be adopted as the change objects among the home screen setting items to be changed by the theme change unit 24 in association with the change of the theme. In accordance with the change object setting received by the operation reception unit 22, the theme change unit 24 changes the background image, the design of the icons 11, and the like. By virtue of this, for example, in a case that the user does not desire to change the arrangement of the icons 111, a part of the automatic change performed in association with the theme is allowed to be cancelled.

In the game machine 1 according to the present embodiment, the BGM and the sound effect may collectively be changed in association with the change of the theme. In the game machine 1, the BGM or the sound effect and the vibration pattern of the vibration motor 17 may collectively be changed. As a result, setting items having a high relevance to each other are allowed to be collectively changed.

In the information processing system according to the present embodiment, the server device 5 distributes a theme (obtained by collecting raw materials for the theme such as the image data of a background image, the setting information of the color of the icons 111, the music data of the BGM, the sound data of the sound effect, and the data of a vibration pattern) with or without charge. The game machine 1 acquires the distributed theme and then stores the acquired theme into the theme storage unit 11a of the storage unit 11. Then, the game machine 1 is allowed to change the theme of the home screen by using the theme having been acquired from the server device 5 and then stored.

By virtue of this, in the game machine 1, in accordance with the necessity or the preference of the user, the number of themes to which change is allowed to be performed is allowed to be increased. Thus, the aesthetic appearance, the designed variety, and the like of the home screen are expected to be improved.

In the game machine 1 according to the present embodiment, when the operation reception unit 22 has received operation of scrolling the home screen, the display processing unit 21 performs animation of the background image. In accordance with the mode of the operation received by the operation reception unit 22, the display processing unit 21 changes the mode of animation of the background image. For example, in response to scrolling of the home screen, the display processing unit 21 implements an animation that the character 121 drawn in the background image walks. In accordance with the direction of scroll, the display processing unit 21 changes the direction of walking of the character 121 in the background image. In accordance with the speed of scrolling, the display processing unit 21 changes the walking speed of the character 121.

As a technique of implementing the animation, the display processing unit 21 may store a plurality of static images obtained by dividing the situation of walking of the character 121, then select one from the plurality of still images, and then display the selected image as the background image. Then, the display processing unit 21 displays and switches the plurality of still images sequentially in accordance with the scroll operation so that the animation that the character 121 walks is implemented.

In response to scrolling of the home screen, the game machine 1 outputs a sound effect through the speaker 15. When animation of the background image is performed, a sound effect suitable for the animation is allowed to be outputted. For example, when an animation that the character 121 walks is performed, the sound output processing unit 23 of the game machine 1 is allowed to output footstep sound of the character 121 as the sound effect. In accordance with the mode of the received scroll operation, the sound output processing unit 23 changes the output mode of the sound effect. For example, in accordance with the speed of scrolling, the sound output processing unit 23 is allowed to change the reproduction speed, the sound volume, or the like of the sound effect. Even in a configuration of not performing animation of the background image, the game machine 1 may output a sound effect corresponding to scrolling of the home screen. For example, the game machine 1 may have a configuration that during the scroll of the home screen, a part of any musical piece is reproduced and outputted through the speaker 15.

The animation of the background image and the output of the sound effect performed by the game machine 1 are changed in association with the change of the theme of the home screen. That is, when the theme has been changed, the game machine 1 changes the background image of the home screen into a background image corresponding to the theme and then performs animation corresponding to the background image. Similarly, when the theme has been changed, the game machine 1 changes the sound effect into a sound effect corresponding to the theme.

In the information processing system according to the present embodiment, the server device 5 performs distribution of the background image and then the game machine 1 having received the background image changes the background image of the home screen into the received background image. This distribution of the background image performed by the server device 5 is not one performed in response to a request from the game machine 1 and is so-called push-based information distribution performed on the basis of own determination. By virtue of this, the background image of the game machine 1 is automatically changed and hence the user is allowed to enjoy a new background image without performing change operation for the background image. For example, the administrator or the like of the server device 5 is also allowed to distribute to a plurality of the game machines 1 an advertisement-like background image such as an image of a newly released game.

In the game machine 1, the operation reception unit 22 receives settings concerning the permission or non-permission of automatic distribution of the background image and the genre for automatic distribution and then the setting transmission processing unit 26 transmits the settings to the server device 5. The setting reception unit 62 of the server device 5 receives the settings from the game machine 1 and then stores the settings into the user information storage unit 51b. The theme distribution unit 61 of the server device 5 performs automatic distribution of the background image to the game machine 1 of the user who has permitted automatic distribution. The theme distribution unit 61 distributes to the game machine 1 the background image of the genre whose automatic distribution has been permitted by the user. By virtue of this, a situation is avoided that a background image of a genre not desired by the user is automatically distributed and hence the image of the genre not desired is displayed in the background of the home screen of the game machine 1.

In the game machine 1 according to the present embodiment, when a given condition has been satisfied, the background image of the home screen and at least one of the setting items allowed to be changed as a theme are automatically changed. For example, the given condition may be a condition concerning a date, a time of day, a time, or the like. Alternatively, the given condition may be a condition concerning the execution result of a particular application such as a game. For example, the items to be changed together with the background image are the BGM, the sound effect, the design of the icons 111, the arrangement of the icons 111, the design of the window, the design of the software keyboard, the vibration pattern of the vibration motor 17, and the like.

Here, the present embodiment has been described for an example that the information processing device is constructed from the game machine 1. However, employable configurations are not limited to this. For example, a similar technology is allowed to be applied to various information processing devices such as a general-purpose computer, a tablet type terminal device, and a portable telephone. The procedure of processing and the like of the game machine 1 and the server device 5 illustrated in the present embodiment are examples and employable ones are not limited to this. The device configuration of the information processing system and the assignment of the functions to each device are not limited to those described in the present embodiment. For example, at least a part of the functions of the game machine 1 described in the present embodiment may be owned by the server device 5. On the contrary, at least a part of the functions of the server device 5 may be owned by the game machine 1. Further, the functions of the server device 5 may be implemented not by one server device and may be implemented by a plurality of server devices.

The home screen displayed in the game machine 1 in the present embodiment is referred to also as a "basic screen". However, the basic screen is not limited to a home screen and may be a menu screen, a start screen, or the like. Further, for example, the basic screen may be a desktop screen or the like of a PC (Personal Computer). The home screen, the setting screen, and the like illustrated in the figures are examples and employable screens are not limited to these.

In the present embodiment, the setting items allowed to be changed as a theme were the background image, the design of the icons 111, the arrangement of the icons 111, the design of the window, the design of the software keyboard, the BGM, the sound effect, the vibration pattern, and the like. These are examples. Each theme may not contain the above-described ones and may contain items other than the above-described ones. For example, the game machine 1 may have a configuration that the design of the cursor and the design of the software buttons displayed on the display unit 12 are allowed to be changed. For example, the game machine 1 may have a configuration that the emitted-light color, the light-emission pattern, and the like of a light-emitting unit such as an LED provided in the housing are allowed to be changed.

In the present embodiment, a configuration has been employed that the server device 5 sells themes and then the user purchases a theme and then downloads it to the game machine 1 through a network such as the Internet. However, employable configurations are not limited to this. The server device 5 may provide the theme without charge. In this case, the theme may be distributed from the server device 5 to the game machine 1 without performing payment processing and the like between the game machine 1 and the server device 5. A configuration may be employed that the game machine 1 acquires data concerning the theme through a storage medium such as a USB (Universal Serial Bus) memory, a memory card, and a ROM card.

In the present specification, it is to be understood that as for an element or the like described in a singular form and provided with an article "a" or "an", a plurality of such elements are not excluded.

The technology herein is expected to improve the aesthetic appearance, the designed variety, and the like of the display screen.

<Additional Remarks>

The technology herein is allowed to be implemented also as the following information processing methods.

An information processing method comprising:

displaying on a display unit a basic screen containing a selection image and a background image, the selection image being constructed from one or a plurality of images used for receiving selection operation, the background image serving as a background of the selection image;

by using a background image transmission device, transmitting the background image of the selection image;

by using an information processing device, automatically receiving the background image transmitted by the background image transmission device; and when the background image has automatically been received from the background image transmission device, displaying the received background image in the background of the selection image.

An information processing method comprising:

displaying on a display unit a basic screen containing a selection image and a background image, the selection image being constructed from one or a plurality of images used for receiving selection operation, the background image serving as a background of the selection image;

determining whether a given condition has been satisfied; and when the given condition has been determined as having been satisfied, changing the background image and at least one of the setting items, other than the background image, concerning the user interface.

What is claimed is:

1. An information processing system comprising:
a first information processing device including a hardware processor configured to control displaying on a display of a basic screen comprising a selection image and a first background image, the selection image comprising one or a plurality of selectable images, the first background image serving as a background of the selection image; and
a second information processing device configured to transmit the first background image of the basic screen, wherein
the hardware processor of the first information processing device is configured to control the first information processing device to automatically receive the first background image transmitted by the second information processing device and to control display of the received first background image in the background of the selection image,
the hardware processor of the first information processing device is further configured to control the first information processing device to automatically transmit, to the second information processing device, a background image request for requesting the first background image, and
the second information processing device is configured to transmit the first background image to the first information processing device in response to the background image request.

2. The information processing system according to claim 1, wherein the second information processing device is further configured to perform push-based distribution to the first information processing device of a second background image different from the first background image.

3. The information processing system according to claim 1, wherein the second information processing device is configured to transmit the first background image to the first information processing device based on a transmission condition.

4. The information processing system according to claim 3, wherein the second information processing device comprises storage for storing background images of different types, and the second information processing device is configured to transmit a background image of a type defined as the transmission condition as the first background image.

5. The information processing system according to claim 4, wherein
the hardware processor of the first information processing device is configured to:
receive setting of the type; and
control transmitting to the second information processing device the received setting, and wherein
in accordance with setting of the type received from the first information processing device, the second information processing device transmits the first background image.

6. The information processing system according to claim 1, wherein
the hardware processor of the first information processing device is configured to:
control receiving setting of permission or non-permission of transmitting of the first background image performed by the second information processing device; and
control transmitting to the second information processing device the received setting, and wherein
in accordance with the setting of permission or non-permission received from the first information processing device, the second information processing device is configured to transmit the first background image to the first information processing device when transmitting is permitted.

7. The information processing system according to claim 1, wherein
the hardware processor of the first information processing device is configured to:
determine whether a given condition has been satisfied; and
when the determining determines that the given condition has been satisfied, control changing the first background image and at least one setting item, other than the first background image, concerning the user interface.

8. An information processing system comprising:
a hardware processor configured to:
control displaying on a display of a basic screen comprising a selection image and a background image, the selection image comprising one or a plurality of selectable images, the background image serving as a background of the selection image;
determine whether a given condition has been satisfied;
control, when the determining determines that the given condition has been satisfied, the information processing device to automatically transmit, to another information processing system, a background image request for requesting the background image;
control the information processing system to automatically receive the background image transmitted by the other information processing system; and
control display of the background image in the background of the selection image and changing of at least one setting item, other than the background image, concerning a user interface.

9. The information processing system according to claim 8, wherein the given condition is a condition concerning a date, a time of day, or a time.

10. The information processing system according to claim 8, wherein the given condition is a condition that a given application is being executed by the hardware processor.

11. The information processing system according to claim 8, wherein the at least one setting item includes one or more of a Background Music (BGM), a sound effect, a design of an icon, and a design of a window.

12. An information processing device comprising:
a hardware processor configured to:
control displaying on a display of a basic screen comprising a selection image and a background image, the selection image comprising one or a plurality of selectable images, the background image serving as a background of the selection image;
control the information processing device to automatically transmit, to another information processing device, a background image request for requesting the background image;
control the information processing device to automatically receive the background image transmitted by the other information processing device; and
control display of the background image in the background of the selection image.

13. A non-transitory recording medium in which an information processing program is recorded, the program, when executed, causing an information processing device to perform:
displaying on a display of a basic screen comprising a selection image and a background image, the selection image comprising one or a plurality of selectable images, the background image serving as a background of the selection image;
automatic transmitting, to another information processing device, of a background image request for requesting the background image;
automatic receiving, from the other information processing device, of the background image; and
displaying of the background image in the background of the selection image.

14. A non-transitory recording medium in which an information processing program is recorded, the program, when executed, causing an information processing device to perform:
displaying on a display of a basic screen comprising a selection image and a background image, the selection image comprising one or a plurality of selectable images, the background image serving as a background of the selection image;
determining whether a given condition has been satisfied;
when the determining determines that the given condition has been satisfied, automatic transmitting, to another information processing device, of a background image request for requesting the background image;
automatic receiving of the background image transmitted by the other information processing device; and displaying of the background image in the background of the selection image and changing of at least one setting item, other than the background image, concerning the user interface.

* * * * *